United States Patent
Parayatham et al.

(10) Patent No.: US 10,733,156 B2
(45) Date of Patent: Aug. 4, 2020

(54) PARALLEL DISCRETIZATION OF CONTINUOUS VARIABLES IN SUPERVISED OR CLASSIFIED DATASET

(71) Applicant: Innominds Inc., San Jose, CA (US)

(72) Inventors: Arun Kumar Parayatham, Hyderabad (IN); Ravi Kumar Meduri, Secunderabad (IN)

( * ) Notice: Subject to any disclaimer, the term of this patent is extended or adjusted under 35 U.S.C. 154(b) by 244 days.

(21) Appl. No.: 15/676,041

(22) Filed: Aug. 14, 2017

(65) Prior Publication Data

US 2019/0050429 A1    Feb. 14, 2019

(51) Int. Cl.
| | |
|---|---|
| *G06F 16/00* | (2019.01) |
| *G06F 16/21* | (2019.01) |
| *G06N 7/00* | (2006.01) |
| *G06N 20/00* | (2019.01) |
| *G06F 16/22* | (2019.01) |

(52) U.S. Cl.
CPC ........ *G06F 16/211* (2019.01); *G06F 16/2228* (2019.01); *G06N 7/005* (2013.01); *G06N 20/00* (2019.01)

(58) Field of Classification Search
CPC .............. G06F 16/211; G06F 16/2228; G06F 16/2453; G06F 16/278; G06N 20/00; G06N 7/005
See application file for complete search history.

(56) References Cited

U.S. PATENT DOCUMENTS

| | | | | |
|---|---|---|---|---|
| 9,805,108 | B2* | 10/2017 | Merriman | G06F 16/273 |
| 2012/0143873 | A1* | 6/2012 | Saadat | G06F 16/278 |
| | | | | 707/741 |
| 2014/0032525 | A1* | 1/2014 | Merriman | G06F 16/244 |
| | | | | 707/713 |
| 2014/0032579 | A1* | 1/2014 | Merriman | G06F 16/258 |
| | | | | 707/756 |

* cited by examiner

*Primary Examiner* — Tony Mahmoudi
*Assistant Examiner* — Thai V Dang

(57) ABSTRACT

The software system discretises continuous attributes by initially sorting attribute value pairs. The system creates partitions based on unique attribute index. The computing system adds attribute value records to the partition element until minimum frequency has been reached. The system calculates whether new partition element is mutually insignificant compared with each of partition elements in a bucket. The system adds the mutually insignificant partition element into the bucket; otherwise, the system closes the bucket and creates a new bucket to add the mutually significant partition element to the new bucket. After all the buckets have been created, the system groups buckets of continuous attributes in to a bucket group so that the buckets in a group are mutually insignificant. If bucket is mutually significant, the system creates a new bucket group and adds subsequent mutually significant bucket to said new bucket group.

9 Claims, 6 Drawing Sheets

PARALLEL DISCRETIZATION OF CONTINUOUS VARIABLES IN SUPERVISED OR CLASSIFIED DATASET

BACKGROUND OF THE INVENTION

Some machine learning algorithms require all attributes to be discrete. Even if they did not mandate discrete attributes these machine learning algorithms do not work very well when the attributes are continuous. This is particularly true for non-parametric methods that explore non-linear relations between attributes. Given these limitations, most data scientists, prior to applying such machine learning algorithms on a classified dataset, discretize all continuous attributes of that dataset. The discretization of continuous attributes is a process of finding a set of subintervals without overlap, which constitutes a partition of that attribute, and mapping those subintervals into buckets or discrete values. Different intervals may be mapped into same bucket, but one interval cannot be mapped in to several buckets.

The discretization method is also called cardinality reduction of continuous attributes where the total number of unique values that the attribute takes is reduced. The performance of such machine learning algorithms depends on right methods of discretization which minimize information loss in grouping continuous values in to buckets. There are two types of discretization methods, unsupervised when no classified data set is available and supervised where a classified dataset is available. Most of the machine learning algorithms are used to build class prediction models for a given dataset. Supervised discretization methods consider class variable while discretizing the continuous values and thus improve performance of model prediction compared to other discretization methods that do not consider the class variable.

The methods available at present use either Chi Square tests or any statistical significance tests which use contingency tables for two consecutive subintervals (when arranged in an ascending or descending order) to merge them into one subinterval. These merged intervals will be tested by Chi Square test or any statistical significance tests to merge further with next consecutive interval. In this process, there is no guarantee that these merges minimize for the loss of information. Existing methods merge adjacent subintervals only. There may be several subintervals which are not adjacent but mutually insignificant (statistically equal class proportions) with respect to class distribution.

At present, most of the methods initially create many subintervals either based on uniform scaling (fixed width) or by putting sequential values into one bucket to maintain a minimum frequency and then compare sequentially these subintervals for statistical significance. Sequential buckets which are not significant with one another are merged together. This method has a flaw.

For example using the existing methods, three subintervals I1, I2 and I3 are such that (I1, I2) and (I2, I3) are found statistically insignificant as pairs but there is no guarantee that pair (I1, I3) will be statistically insignificant. In this case, present methods merge all three buckets I1, I2 and I3 though I1and I3 are statistically significant. To overcome this flaw, one must check all the buckets mutually for their statistical significance to be merged together. In a case of n subintervals to be merged together there will be up to $O(n^2)$ statistical significance tests to be done. Moreover, the system must scan dataset several times if the data doesn't fit into local memory.

SUMMARY OF THE INVENTION

The software system processes through the following steps to discretise continuous attributes with minimum loss of information in a large dataset using a distributed algorithm across multiple computing systems.

A computer implemented method to obtain discrete partitions from continuous attributes in a supervised classification scenario using multiple processors. The software system reads data set records in parallel from the assigned row based partitions to a processor. The system forming a key value pair where a key of the key value pair is based on a continuous attribute index and attribute value and a value of the key value pair is based on decision attribute value. The software system sorts sorting the attribute value in ascending order on attribute index followed by attribute value. The system creates partitions based on unique attribute index. The software system adds data records sequentially to a partition until attribute value of record is same as upper limit of that partition element or until minimum frequency has been reached for that partition. The system adds each partition element to a bucket until it is mutually insignificant with all partition elements exist in that bucket.

The computer system processes all partition elements formed at the computing node. The system calculates new partition element via computing node which is mutually insignificant compared with each of partition elements in a bucket. When the partition element is mutually insignificant, the system adds the partition element into said bucket. When the partition element is mutually significant, the software system closes said bucket and writes to a file. The system then creates a new bucket to add said partition element to said new bucket.

The software system then reads all buckets via multiple computing nodes with each key based on attribute index. The system sorts the buckets by attribute index and followed by success probability of the bucket. The software system groups buckets of continuous attributes in to a bucket group so that the buckets in a group are mutually insignificant. If bucket is mutually significant, the system creates a new bucket group and adds subsequent mutually significant bucket to said new bucket group.

DETAILED DESCRIPTION

Figure 1:
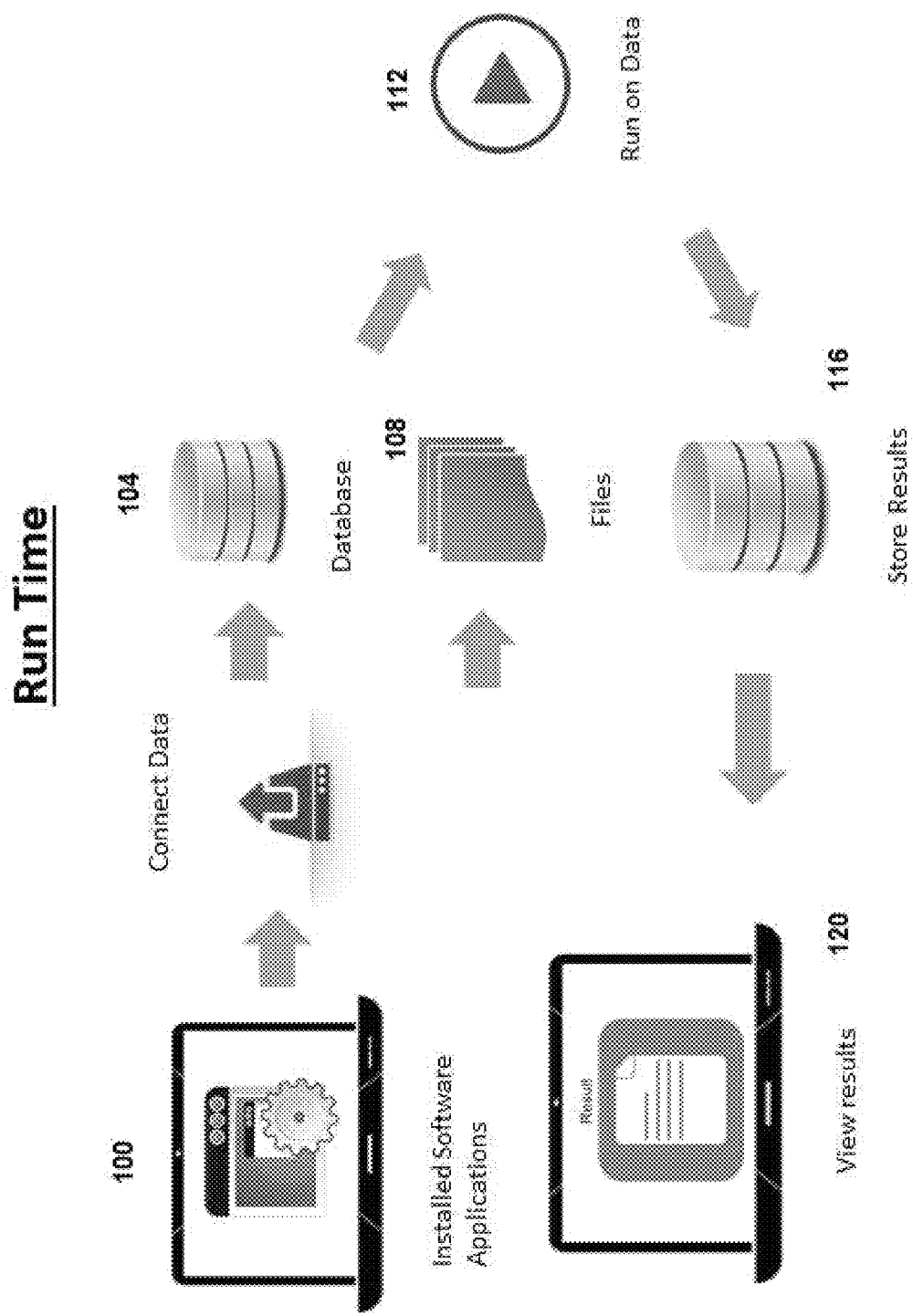
FIG. 1 shows the runtime operating of the embodiment of the invention on a computing system

An embodiment of the invention uses a supervised parallel discretization method based on statistical significance tests for comparing proportions of a class between two subintervals drawn from all the continuous attributes in the dataset. The algorithm discretizes all the continuous attributes present in the data set in parallel with a single scan of the data set irrespective of its size. The embodiment minimizes information loss and optimizes the performance of such machine learning algorithms which require only discrete attributes.

The embodiment maps the subintervals into different buckets, so that all the subintervals in a bucket are mutually insignificant. As the first step, the embodiment partitions each continuous attribute in to a set of sequential subintervals of having minimum frequency chosen by the user. Then these sequential subintervals are merged in to a bucket if they are mutually insignificant with respect to class distribution. In other words, the embodiment adds a new subinterval with a bucket only if it is insignificant with subintervals already present in the bucket. In a case of n subintervals to be merged together in to a bucket there will be up to $O(n^2)$ statistical significance tests to be done. Moreover, the system must scan dataset several times if the data doesn't fit into local memory. The embodiment reduces number of statistical significance tests to a considerably low number if not to linear. By this, the embodiment guarantees that all subintervals put in to one bucket are mutually insignificant with respect to class distribution.

Definitions

In this document, a dataset means a classified data with some conditional attributes and a decision attribute.

A group of the values of the decision attribute can be divided in to two groups as success and failure. Each row in the dataset is called a record. A continuous attribute which is a conditional attribute in the dataset will have real values. The cardinality of these values will be more in general. In other words, the range of a continuous attribute will be $(-\infty, \infty)$. A partition of a continuous attribute is a set of disjoint subintervals $\{I_1, I_2, I_3, \ldots, I_m\}$ of $(-\infty, \infty)$ whose union is $(-\infty, \infty)$. Each $I_j$ is represented as $[I_{jl}, I_{jh})$ for all $j=2, 3, \ldots, m-1$. $I_1$ and $I_m$ are represented as $(-\infty, I_{1h})$ and $[I_{ml}, \infty)$. $I_j$ is called a lower subinterval of $I_k$ if $I_{jh} \leq I_{kl}$. $I_j$ and $I_k$ are called adjacent subintervals $I_{jh}=I_{kl}$. Merging two adjacent subintervals means creating a new subinterval $I_j \cup I_k = [I_{jl}, I_{kh})$.

The record set of a subinterval or a group of subintervals of a continuous attribute is the set of records whose values for that continuous attribute are in those subintervals or in that group of intervals. The number of records for each subinterval $I_j$ is denoted by $n_j$. The sample probability of success for each subinterval $I_j$ is denoted by $p_j$. The standard error is defined as $$s_j = \sqrt{\frac{p_j(1-p_j)}{n_j}}$$

for each $j=1, 2, \ldots, m$. The standard error is always between 0 to $$\sqrt{\frac{1}{4n_j}}.$$

Two subintervals of a continuous attribute are mutually insignificant if the corresponding record sets defined by them are insignificant with respect to class distribution they have. A sub interval $I_k$ is called a right side insignificant sub interval to $I_j$, provided if $$\frac{p_k - p_j}{\sqrt{s_j^2 + s_k^2}} < Z_{(1-\frac{\alpha}{2})}$$

where $$\frac{\alpha}{2}$$

is the specified significance level and $$Z_{(\frac{\alpha}{2})}$$

is the cumulative standard normal distribution Z score of $$\frac{\alpha}{2}.$$

A sub interval $I_k$ is called left side insignificant sub interval to $I_j$, provided if $$\frac{p_j - p_k}{\sqrt{s_j^2 + s_k^2}} < Z_{(1-\frac{\alpha}{2})}$$

where $$\frac{\alpha}{2}$$

is the specified significance level and $$Z_{(\frac{\alpha}{2})}$$

is the cumulative standard normal distribution Z score of $$\frac{\alpha}{2}.$$

Two sub intervals $I_j$, $I_k$ are mutually insignificant if $$\frac{|p_j - p_k|}{\sqrt{s_j^2 + s_k^2}} < Z_{(1-\frac{\alpha}{2})}$$

where $\alpha$ is the specified significance level and $$Z_{(1-\frac{\alpha}{2})}$$

is the standard normal distribution Z score of $$1 - \frac{\alpha}{2}.$$

The subinterval $I_k$ is insignificant with subinterval $I_j$ provided $I_k$ is right and left side insignificant intervals to $I_j$. In other words, $I_j$, $I_k$ are mutually insignificant if $$p_k \leq p_j + Z_{\left(1-\frac{\alpha}{2}\right)}\sqrt{s_j^2 + s_k^2} \text{ and } p_k \geq p_j - Z_{\left(1-\frac{\alpha}{2}\right)}\sqrt{s_j^2 + s_k^2}.$$

To test whether $I_k$ is insignificant with $I_j$, it is enough to compute right and left critical values $$p_j + Z_{\left(1-\frac{\alpha}{2}\right)}\sqrt{s_j^2 + s_k^2} \text{ and } p_j - Z_{\left(1-\frac{\alpha}{2}\right)}\sqrt{s_j^2 + s_k^2}$$

and check whether $$p_k \leq p_j + Z_{\left(1-\frac{\alpha}{2}\right)}\sqrt{s_j^2 + s_k^2} \text{ and } p_k \geq p_j - Z_{\left(1-\frac{\alpha}{2}\right)}\sqrt{s_j^2 + s_k^2}.$$

For a given significance level, a real number RCV (right critical value) is called the right critical value of an interval I of a continuous attribute with success probability $p_k$ if any interval J of that attribute with success probability $p_j$ less than RCV is not statistically significant higher value than success probability $p_k$ of I, and if any interval J of that attribute with success probability $p_j$ not less than RCV is statistically significant high value than success probability $p_k$ of I.

For a given significance level, a real number RCVLL (right critical value lower limit) is called a right critical value lower limit of an interval I of a continuous attribute with success probability $p_k$ if any interval J of that attribute with success probability $p_j$ less than RCVLL is not statistically significant high value than success probability $p_k$ of I.

For a given significance level, a real number RCVUL (right critical value upper limit) is called a right critical value upper limit of an interval I of a continuous attribute with success probability $p_k$ if any interval J of that attribute with success probability $p_j$ not less than RCVUL is statistically significant high value than success probability $p_k$ of I.

An interval I is called right dominant over another interval J if a right critical value upper limit for I is smaller than a right critical value lower limit for J.

For a given significance level, a real number LCV (left critical value) is called the left critical value of an interval I of a continuous attribute with success probability $p_k$ if any interval J of that attribute with success probability $p_j$ less than LCV is statistically significant low value than success probability $p_k$ of I, and if any interval J of that attribute with success probability $p_j$ not less than LCV is not statistically significant low value than success probability $p_k$ of I.

For a given significance level, a real number LCVUL (left critical value upper limit) is called a left critical value lower limit of an interval I of a continuous attribute with success probability $p_k$ if any interval J of that attribute with success probability $p_j$ less than LCVLL (left critical value lower limit) is statistically significant low value than success probability $p_k$ of I.

An interval I is called left dominant over another interval J if a left critical value lower limit for I is greater than a left critical value upper limit for J.

Right critical value lower limit for $I_j$ is defined as $$p_j + Z_{\left(1-\frac{\alpha}{2}\right)}\sqrt{s_j^2}.$$

Right critical value upper limit for $I_j$ is defined as $$\begin{cases} p_j + Z_{\left(1-\frac{\alpha}{2}\right)}\sqrt{s_j^2 + \frac{1}{4n}} & \text{if } p_j \leq 0.5 \\ p_j + Z_{\left(1-\frac{\alpha}{2}\right)}\sqrt{s_j^2 + \frac{p_j(1-p_j)}{n}} & \text{if } p_j > 0.5 \end{cases}$$

Left critical value upper limit for $I_j$ is defined as $$p_j - Z_{\left(1-\frac{\alpha}{2}\right)}\sqrt{s_j^2}.$$

Left critical value lower limit for $I_j$ is defined as $$\begin{cases} p_j - Z_{\left(1-\frac{\alpha}{2}\right)}\sqrt{s_j^2 + \frac{1}{4n}} & \text{if } p_j \geq 0.5 \\ p_j - Z_{\left(1-\frac{\alpha}{2}\right)}\sqrt{s_j^2 + \frac{p_j(1-p_j)}{n}} & \text{if } p_j < 0.5 \end{cases}$$

$I_j$ is called right dominant over $I_k$ if right critical value upper limit for $I_j$ is smaller than the right critical value lower limit for $I_k$. Similarly $I_j$ is called left dominant over $I_k$ if left critical value lower limit for $I_j$ is greater than the right critical value upper limit for $I_k$.

A bucket is a set of sequential mutually insignificant subintervals of a partition of the continuous attribute.

Two buckets are called insignificant with respect to probability of success if (1) they are mutually insignificant and (2) each subinterval of first bucket is mutually insignificant with each subinterval of second bucket.

A bucket group is a set of mutually insignificant buckets.

Statistical Basis of the Algorithm

Let D be the classified data set which has some continuous conditional attributes and a decision attribute with success and failure values. D is treated as a set of classified records. Let subintervals $\{I_1, I_2, I_3, \ldots, I_m\}$ form a partition of D. Let n be the minimum number of records in each subinterval of this partition. Let the set of subintervals $I_g$, $I_{g+1}$, $I_{g+2}, \ldots, I_{g+h}$ of this partition are mutually insignificant. Let $p_g$, $p_{g+1}$, $p_{g+2}, \ldots, p_{g+h}$ be the probabilities of success respectively for the set of subintervals $I_g$, $I_{g+1}$, $I_{g+2}, \ldots, I_{g+h}$. Let $s_g$, $s_{g+1}$, $s_{g+2}, \ldots, s_{g+h}$ be the standard errors of success ratios respectively for the set of subintervals $I_g$, $I_{g+1}$, $I_{g+2}, \ldots, I_{g+h}$. To test whether $I_{g+h+1}$ can be added to this mutually insignificant set of subintervals, the pairs $(I_g, I_{g+h+1})$, $(I_{g+1}, I_{g+h+1}), \ldots, (I_{g+h}, I_{g+h+1})$ must be verified as mutually insignificant.

If $I_{g+h+1}$ is mutually insignificant with each of $I_g$, $I_{g+1}$, $I_{g+2}, \ldots, I_{g+h}$ then, $$p_{g+h+1} \leq \text{minimum of}$$

$$\left\{ p_{g+1} + Z_{\left(1-\frac{\alpha}{2}\right)}\sqrt{s_{g+1}^2 + s_{g+h+1}^2}, \; p_{g+1} + Z_{\left(1-\frac{\alpha}{2}\right)}\sqrt{s_{g+2}^2 + s_{g+h+1}^2}, \right.$$
$$\left. \ldots, p_{g+h} + Z_{\left(1-\frac{\alpha}{2}\right)}\sqrt{s_{g+h}^2 + s_{g+h+1}^2} \right\}, \text{ and}$$

$$p_{g+h+1} \geq \text{maximum of } \left\{ p_{g+1} - Z_{\left(1-\frac{\alpha}{2}\right)}\sqrt{s_{g+1}^2 + s_{g+h+1}^2}, \right.$$
$$\left. p_{g+1} - Z_{\left(1-\frac{\alpha}{2}\right)}\sqrt{s_{g+2}^2 + s_{g+h+1}^2}, \ldots, p_{g+h} - Z_{\left(1-\frac{\alpha}{2}\right)}\sqrt{s_{g+h}^2 + s_{g+h+1}^2} \right\}.$$

Possible

Maximum of $p_{g+h+1}$ = minimum of $$\left\{ p_{g+1} + Z_{\left(1-\frac{\alpha}{2}\right)}\sqrt{s_{g+1}^2 + s_{g+h+1}^2}, \; p_{g+1} + Z_{\left(1-\frac{\alpha}{2}\right)}\sqrt{s_{g+2}^2 + s_{g+h+1}^2}, \right.$$
$$\left. \ldots, p_{g+h} + Z_{\left(1-\frac{\alpha}{2}\right)}\sqrt{s_{g+h}^2 + s_{g+h+1}^2} \right\}.$$

Possible

Minimum of $p_{g+h+1}$ = Maximum of $$\left\{ \left\{ p_{g+1} - Z_{\left(1-\frac{\alpha}{2}\right)}\sqrt{s_{g+1}^2 + s_{g+h+1}^2}, \; p_{g+1} - Z_{\left(1-\frac{\alpha}{2}\right)}\sqrt{s_{g+2}^2 + s_{g+h+1}^2}, \right. \right.$$
$$\left. \left. \ldots, p_{g+h} - Z_{\left(1-\frac{\alpha}{2}\right)}\sqrt{s_{g+h}^2 + s_{g+h+1}^2} \right\} \right\}.$$

To prove $I_{g+h+1}$ is mutually insignificant with each of $I_g$, $I_{g+1}$, $I_{g+2}$, ..., $I_{g+h}$, it is enough to prove $I_{g+h+1}$ is mutually left side and right side insignificant with each of $I_g$, $I_{g+1}$, $I_{g+2}$, ..., $I_{g+h}$.

If $(I_{g+1}, I_{g+h+1})$, $(I_{g+2}, I_{g+h+1})$, ..., $(I_{g+h}, I_{g+h+1})$, are mutually right side insignificant pairs then $$p_{g+h+1} \leq p_{g+1} + Z_{\left(1-\frac{\alpha}{2}\right)}\sqrt{s_{g+1}^2 + s_{g+h+1}^2},$$

$$p_{g+h+1} \leq p_{g+2} + Z_{\left(1-\frac{\alpha}{2}\right)}\sqrt{s_{g+2}^2 + s_{g+h+1}^2}, \ldots,$$

$$p_{g+h+1} \leq p_{g+h} + Z_{\left(1-\frac{\alpha}{2}\right)}\sqrt{s_{g+h}^2 + s_{g+h+1}^2}.$$

If $p_j \leq p_k$ and $s_j \leq s_k$ then $p_j + Z_{\left(1-\frac{\alpha}{2}\right)}\sqrt{s_{g+h+1}^2 + s_j^2} \leq$ $$p_k + Z_{\left(1-\frac{\alpha}{2}\right)}\sqrt{s_{g+h+1}^2 + s_k^2} \text{ for } g \leq j, k \leq g+h.$$

If the pair $(I_j, I_{g+h+1})$ is right side mutually insignificant, $p_j \leq p_k$ and $s_j \leq s_k$, then the pair $(I_k, I_{g+h+1})$ is also right side mutually insignificant. In other words, $I_j$ is right dominant whenever $p_j \leq p_k$ and $s_j \leq s_k$.

Rule 1: If subinterval $I_j$ is right side insignificant with subinterval $I_l$, and the success probability of subinterval $I_j$ is not greater than the success probability of subinterval $I_k$ and the standard error of the success probability of subinterval $I_j$ is not greater than the standard error of the success probability of subinterval $I_k$, then subinterval $I_k$ is also right side insignificant with subinterval $I_l$. In other words, subinterval $I_j$ is right dominant over subinterval $I_l$ whenever the success probability of subinterval $I_j$ is not greater than the success probability of subinterval $I_k$ and the standard error of the success probability of subinterval $I_j$ is not greater than the standard error of the success probability of subinterval $I_k$.

Otherwise

If $p_{g+h+1} \leq$ minimum of $\{p_g, p_{g+1}, \ldots, p_{g+h}\}$ then $(I_{g+1}, I_{g+h+1})$, $(I_{g+2}, I_{g+h+1})$, ..., $(I_{g+h}, I_{g+h+1})$, are mutually right side insignificant pairs.

Case 1: If minimum of $\{p_g, p_{g+1}, \ldots, p_{g+h}\} \leq 0.5$, then any subinterval $I_j$ fails to be right side insignificant with one of $I_g$, $I_{g+1}$, $I_{g+2}$, ..., $I_{g+h}$ then $p_j >$ minimum of $\{p_g, p_{g+1}, \ldots, p_{g+h}\}$ and $$0 \leq s_j \leq \sqrt{\frac{1}{4n}}.$$

If $$p_j + Z_{\left(1-\frac{\alpha}{2}\right)}\sqrt{\frac{1}{4n} + s_j^2} \leq p_k + Z_{\left(1-\frac{\alpha}{2}\right)}\sqrt{s_k^2},$$

then the pair $(I_k, I_{g+h+1})$ is mutually right side insignificant whenever the pair $(I_j, I_{g+h+1})$ is mutually right side insignificant $g \leq j$, $k \leq g+h$. In other words, $I_j$ is right dominant whenever $$p_j + Z_{\left(1-\frac{\alpha}{2}\right)}\sqrt{\frac{1}{4n} + s_j^2} \leq p_k + Z_{\left(1-\frac{\alpha}{2}\right)}\sqrt{s_k^2}.$$

Note that, $$p_j + Z_{\left(1-\frac{\alpha}{2}\right)}\sqrt{\frac{1}{4n} + s_j^2}$$

is right critical value upper limit for $I_j$ and $$p_k + Z_{\left(1-\frac{\alpha}{2}\right)}\sqrt{s_k^2}$$

is right critical value lower limit for $I_k$.

Rule 2a: Let $p_j$, $p_k$ be success probabilities of subinterval $I_j$ and subinterval $I_k$ and $s_j$, $s_k$ be the standard errors of success probabilities of $I_j$ and $I_k$. If minimum, of $\{p_j, p_k\} \leq 0.5$, then any subinterval $I_l$ fails to be right side insignificant with either $I_j$ or $I_k$ then $p_l >$ minimum of $\{p_j, p_k\}$ and the standard error $s_l$ of success probability of $I_l$ is bounded by $$0 \leq s_l \leq \sqrt{\frac{1}{4n}}.$$

If right critical value upper limit $$p_j + Z_{\left(1-\frac{\alpha}{2}\right)}\sqrt{\frac{1}{4n} + s_j^2}$$

for $I_j$ is not greater than the right critical value lower limit $$p_k + Z_{(1-\frac{\alpha}{2})}\sqrt{s_k^2}$$

for $I_k$, then $I_l$ is right side insignificant over $I_k$ whenever $I_l$ is right side insignificant over $I_j$. In other words, $I_j$ is right dominant whenever $$p_j + Z_{(1-\frac{\alpha}{2})}\sqrt{\frac{1}{4n} + s_j^2} \leq p_k + Z_{(1-\frac{\alpha}{2})}\sqrt{s_k^2}$$

(right critical value upper limit $(I_j)$<=right critical value lower limit $(I_k)$).

Case 2: If minimum, of $\{p_g, p_{g+1}, \ldots, p_{g+h}\} > 0.5$, then any subinterval fails to be right side insignificant with one of $I_g$, $I_{g+1}, I_{g+2}, \ldots, I_{g+h}$ then $p_{g+h+1}$>minimum of $\{p_g, p_{g+1}, \ldots, p_{g+h}\}$ and $$0 \leq s_{g+h+1} \leq \sqrt{\frac{\text{minimum of } \{p_g, p_{g+1}, \ldots, p_{g+h}\} * (1 - \text{minimum of } \{p_g, p_{g+1}, \ldots, p_{g+h}\})}{4n}}$$

If $p_{g+h+1} \leq$ minimum of $\{p_g, p_{+1}, \ldots, p_{g+h}\}$ then it will be mutually right insignificant with each of $I_g, I_{g+1}, I_{g+2}, \ldots, I_{g+h}$.

If $$p_j + Z_{(1-\frac{\alpha}{2})}\sqrt{\frac{\text{minimum of } \{p_g, p_{g+1}, \ldots, p_{g+h}\} * (1 - \text{minimum of } \{p_g, p_{g+1}, \ldots, p_{g+h}\})}{4n} + s_j^2} \leq p_k + Z_{(1-\frac{\alpha}{2})}\sqrt{s_k^2},$$

then the pair $(I_k, I_{g+h+1})$ is mutually right side insignificant whenever the pair $(I_j, I_{g+h+1})$ is mutually right side insignificant g≤j, k≤g+h.

Note that, $$p_j + Z_{(1-\frac{\alpha}{2})}\sqrt{\frac{\text{minimum of } \{p_g, p_{g+1}, \ldots, p_{g+h}\} * (1 - \text{minimum of } \{p_g, p_{g+1}, \ldots, p_{g+h}\})}{4n} + s_j^2}$$

is possible right critical value upper limit in this case for $I_j$ and $$p_k + Z_{(1-\frac{\alpha}{2})}\sqrt{s_k^2}$$

is right critical value lower limit for $I_k$. In other words, $I_j$ is right dominant whenever $$p_j + Z_{(1-\frac{\alpha}{2})}\sqrt{\frac{\text{minimum of } \{p_g, p_{g+1}, \ldots, p_{g+h}\} * (1 - \text{minimum of } \{p_g, p_{g+1}, \ldots, p_{g+h}\})}{4n} + s_j^2} \leq p_k + Z_{(1-\frac{\alpha}{2})}\sqrt{s_k^2}.$$

Rule 2b: Let $p_j$, $p_k$ be success probabilities of $I_j$ and $I_k$ and $s_j$, $s_k$ be the standard errors of success probabilities of $I_j$ and $I_k$. If minimum of $\{p_j, p_k\} > 0.5$, then any subinterval $I_l$ fails to be right side insignificant with either $I_j$ or $I_k$ then $p_l$>minimum of $\{p_j, p_k\}$ and the standard error $s_l$ of success probability of $I_l$ is bounded by $$0 \leq s_l \leq \sqrt{\frac{\text{minimum of } \{p_j, p_k\} * (1 - \text{minimum of } \{p_j, p_k\})}{4n}}.$$

If right critical value upper limit $$p_j + Z_{(1-\frac{\alpha}{2})}\sqrt{\frac{\text{minimum of } \{p_j, p_k\} * (1 - \text{minimum of } \{p_j, p_k\})}{4n} + s_j^2}$$

for $I_j$ is not greater than the right critical value lower limit $$p_j + Z_{(1-\frac{\alpha}{2})}\sqrt{s_k^2}$$

for $I_k$, then $I_l$ is right side insignificant over $I_k$ whenever $I_l$ is right side insignificant over $I_j$. In other words, $I_j$ is right dominant whenever $$p_j + Z_{(1-\frac{\alpha}{2})}\sqrt{\frac{\text{minimum of } \{p_j, p_k\} * (1 - \text{minimum of } \{p_j, p_k\})}{4n} + s_j^2} \leq p_k + Z_{(1-\frac{\alpha}{2})}\sqrt{s_k^2}$$

(right critical value upper limit $(I_j)$<=right crucial value lower limit $(I_k)$).

By using Rules 1, 2a, 2b, the system can form a subset $I_{t1}$, $I_{t2}, I_{t3}, \ldots, I_{tk}$ of mutually right insignificant subintervals $I_g$, $I_{g+1}, I_{g+2}, \ldots, I_{g+h}$ such that $I_{g+h+1}$ is mutually right insignificant with all $I_g, I_{g+1}, I_{g+2}, \ldots, I_{g+h}$ if it is mutually right insignificant with $I_{t1}, I_{t2}, I_{t3}, \ldots, I_{tk}$. Whenever a new interval $I_{g+h+1}$ is added to the mutually insignificant subintervals $I_g, I_{g+1}, I_{g+2}, \ldots, I_{g+h}$, then $I_{g+h+1}$ is added to the subset $I_{t1}, I_{t2}, I_{t3}, \ldots, I_{tk}$ if none of these $I_{t1}, I_{t2}, I_{t3}, \ldots, I_{tk}$ is right dominant to $I_{g+h+1}$. If $I_{g+h+1}$ is added to the subset $I_{t1}, I_{t2}, I_{t3}, \ldots, I_{tk}$, then all those subintervals which are already part of it and right dominated by $I_{g+h+1}$ are removed from this subset. The subintervals $I_{t1}, I_{t2}, I_{t3}, \ldots, I_{tk}$ satisfy that none of these are right dominant over other. To ensure $I_{g+h+1}$ is right side insignificant with each of $I_g, I_{g+1}$, $I_{g+2}, \ldots, I_{g+h}$, it is enough to check whether $I_{g+h+1}$ is right side insignificant with each of $I_{t1}, I_{t2}, I_{t3}, \ldots, I_{tk}$.

If $(I_{g+1}, I_{g+h+1}), (I_{g+2}, I_{g+h+1}), \ldots, (I_{g+h}, I_{g+h+1})$, are mutually left side insignificant pairs then $$p_{g+h+1} \geq p_{g+1} - Z_{(1-\frac{\alpha}{2})}\sqrt{s_{g+h+1}^2 + s_{g+1}^2},$$

$$p_{g+h+1} \geq p_{g+2} - Z_{(1-\frac{\alpha}{2})}\sqrt{s_{g+h+1}^2 + s_{g+2}^2},$$

$$\ldots, p_{g+h+1} \geq p_{g+h} + Z_{(1-\frac{\alpha}{2})}\sqrt{s_{g+h+1}^2 + s_{g+h}^2}.$$

If $p_j \geq p_k$ and $s_j \leq s_k$ then $$p_j - Z_{(1-\frac{\alpha}{2})}\sqrt{s_{g+h+1}^2 + s_j^2} \geq p_k - Z_{(1-\frac{\alpha}{2})}\sqrt{s_{g+h+1}^2 + s_k^2} \text{ for } g \leq j, k \leq g+h.$$

If the pair ($I_j$, $I_{g+h+1}$) is left side mutually insignificant, $p_j \geq p_k$ and $s_j \leq s_k$, then the pair ($I_k$, $I_{g+h+1}$) is also left side mutually insignificant. In other words, $I_j$ is left dominant whenever $p_j \geq p_k$ and $s_j \leq s_k$.

Rule 3: If $I_j$ is left side insignificant with $I_l$, and the success probability of $I_j$ is not less than the success probability of $I_k$ and the standard error of the success probability of $I_j$ is not greater than the standard error of the success probability of $I_k$, then $I_k$ is also left side insignificant with $I_l$. In other words, $I_j$ is left dominant over $I_l$ whenever the success probability of $I_j$ is not less than the success probability of $I_k$ and the standard error of the success probability of $I_j$ is not greater than the standard error of the success probability of $I_k$.

Otherwise

If $P_{g+h+1} \geq$ maximum of $\{p_g, p_{g+1}, \ldots, p_{g+h}\}$ then $I_{g+1}$, $I_{g+h+1}$), (($I_{g+2}$, $I_{g+h+1}$), . . . , ($I_{g+h}$, $I_{g+h+1}$), are mutually left side insignificant pairs.

Case 1: If maximum of $\{p_g, p_{g+1}, \ldots, p_{g+h}\} \geq 0.5$, then any subinterval $I_j$ fails to be left side insignificant with one of $I_g$, $I_{g+1}, I_{g+2}, \ldots, I_{g+h}$ then $p_j <$ maximum of $\{p_g, p_{g+1}, \ldots, p_{g+h}\}$ and $$0 \leq s_j \leq \sqrt{\frac{1}{4n}}.$$

If $$p_j - Z_{(1-\frac{\alpha}{2})}\sqrt{\frac{1}{4n} + s_j^2} \geq p_k - Z_{(1-\frac{\alpha}{2})}\sqrt{s_k^2},$$

then the pair ($I_k$, $I_{g+h+1}$) is mutually left side insignificant whenever the pair ($I_j$, $I_{g+h+1}$) is mutually right side insignificant for $g \leq j, k \leq g+h$. In other words, $I_j$ is left dominant whenever $$p_j - Z_{(1-\frac{\alpha}{2})}\sqrt{\frac{1}{4n} + s_j^2} \geq p_k - Z_{(1-\frac{\alpha}{2})}\sqrt{s_k^2}.$$

Rule 4a: Let $p_j$, $p_k$ be success probabilities of $I_j$ and $I_k$ and $s_j$, $s_k$ be the standard errors of success probabilities of $I_j$ and $I_k$. If maximum of $\{p_j, p_k\} \geq 0.5$, then any subinterval $I_l$ fails to be left side insignificant with either $I_j$ or $I_k$ then $p_l <$ maximum, of $\{p_j, p_k\}$ and the standard error $s_l$ of success probability of $I_l$ is bounded by $$0 \leq s_l \leq \sqrt{\frac{1}{4n}}.$$

If left critical value lower limit $$p_j - Z_{(1-\frac{\alpha}{2})}\sqrt{\frac{1}{4n} + s_j^2}$$

for $I_j$ is not less than the left critical value upper limit $$p_k - Z_{(1-\frac{\alpha}{2})}\sqrt{s_k^2}$$

for $I_k$, then $I_l$ is left side insignificant over $I_k$ whenever $I_l$ is left side insignificant over $I_j$. In other words, $I_j$ is left dominant whenever $$p_j - Z_{(1-\frac{\alpha}{2})}\sqrt{\frac{1}{4n} + s_j^2} \geq p_k - Z_{(1-\frac{\alpha}{2})}\sqrt{s_k^2}$$

(left critical lower limit ($I_j$)>=left critical value upper limit ($I_k$)).

Note that, $$p_j - Z_{(1-\frac{\alpha}{2})}\sqrt{\frac{1}{4n} + s_j^2}$$

is left critical value lower limit for $I_j$ and $$p_k - Z_{(1-\frac{\alpha}{2})}\sqrt{s_k^2}$$

is left critical value upper limit for $I_k$.

Case 2: If maximum of $\{p_g, p_{g+1}, \ldots, p_{g+h}\} < 0.5$, then any subinterval fails to be left side insignificant with one of $I_g$, $I_{g+1}, I_{g+2}, \ldots, I_{g+h}$ then $p_{g+h+1} <$ maximum of $\{p_g, p_{g+1}, \ldots, p_{g+h}\}$ and $$0 \leq s_{g+h+1} \leq \sqrt{\frac{\text{maximum of } \{p_g, p_{g+1}, \ldots, p_{g+h}\} * (1 - \text{maximum of } \{p_g, p_{g+1}, \ldots, p_{g+h}\})}{4n}}.$$

If $p_{g+h+1} \geq$ maximum of $\{p_g, p_{g+1}, \ldots, p_{g+h}\}$ then it will be mutually left insignificant with each of $I_g$, $I_{g+1}$, $I_{g+2}, \ldots, I_{g+h}$.

If $$p_j - Z_{(1-\frac{\alpha}{2})}\sqrt{\frac{\text{maximum of } \{p_g, p_{g+1}, \ldots, p_{g+h}\} * (1 - \text{maximum of } \{p_g, p_{g+1}, \ldots, p_{g+h}\})}{4n} + s_j^2} \geq$$
$$p_k - Z_{(1-\frac{\alpha}{2})}\sqrt{s_k^2},$$

then the pair ($I_k$, $I_{g+h+1}$) is mutually left side insignificant whenever the pair ($I_j$, $I_{g+h+1}$) is mutually left side insignificant. In other words, $I_j$ is right dominant whenever $$p_j - Z_{\left(1-\frac{\alpha}{2}\right)} \sqrt{\frac{\text{maximum of } \{p_g, p_{g+1}, \ldots, p_{g+h}\} * (1 - \text{maximum of } \{p_g, p_{g+1}, \ldots, p_{g+h}\})}{4n} + s_j^2} \geq$$

$$p_k - Z_{\left(1-\frac{\alpha}{2}\right)} \sqrt{s_k^2}.$$

Rule 4b: Let $p_j$, $p_k$ be success probabilities of subinterval $I_j$ and subinterval $I_k$ and $s_j$, $s_k$ be the standard errors of success probabilities of $I_j$ and $I_k$. If maximum of $\{p_j, p_k\} < 0.5$, then any subinterval $I_l$ fails to be left side insignificant with either $I_j$ or $I_k$ then $p_l$<maximum of $\{p_j, p_k\}$ and the standard error $s_l$ of success probability of $I_l$ is bounded by $$0 \leq s_l \leq \sqrt{\frac{\text{maximum of } \{p_j, p_k\} * (1 - \text{maximum of } \{p_j, p_k\})}{4n}}.$$

If left critical value upper limit $$p_j - Z_{\left(1-\frac{\alpha}{2}\right)} \sqrt{\frac{\text{maximum of } \{p_j, p_k\} * (1 - \text{maximum of } \{p_j, p_k\})}{4n} + s_j^2}$$

for $I_j$ is not less than the left critical value upper limit $$p_k - Z_{\left(1-\frac{\alpha}{2}\right)} \sqrt{s_k^2}$$

for $I_k$, then $I_l$ is left side insignificant over $I_k$ whenever $I_l$ is left side insignificant over $I_j$. In other words, $I_j$ is left dominant whenever $$p_j - Z_{\left(1-\frac{\alpha}{2}\right)} \sqrt{\frac{\text{maximum of } \{p_j, p_k\} * (1 - \text{maximum of } \{p_j, p_k\})}{4n} + s_j^2} \geq$$

$$p_k - Z_{\left(1-\frac{\alpha}{2}\right)} \sqrt{s_k^2}$$

(left critical value upper limit ($I_j$)>=left critical value upper limit ($I_k$)).

Note that, If $$p_j - Z_{\left(1-\frac{\alpha}{2}\right)} \sqrt{\frac{\text{maximum of } \{p_g, p_{g+1}, \ldots, p_{g+h}\} * (1 - \text{maximum of } \{p_g, p_{g+1}, \ldots, p_{g+h}\})}{4n} + s_j^2}$$

is possible left critical value lower limit in this case for $I_j$ and $$p_k - Z_{\left(1-\frac{\alpha}{2}\right)} \sqrt{s_k^2}$$

is left critical value upper limit for $I_k$.

By using Rules 3, 4a, 4b, the system can form a subset $I_{x1}, I_{x2}, I_{x3}, \ldots, I_{xl}$ of mutually left side insignificant subintervals $I_g, I_{g+1}, I_{g+2}, \ldots, I_{g+h}$ such that $I_{g+h+1}$ is mutually left side insignificant with all $I_g, I_{g+1}, I_{g+2}, \ldots, I_{g+h}$ if it is mutually left side insignificant with $I_{x1}, I_{x2}, I_{x3}, \ldots, I_{xl}$. Whenever a new interval $I_{g+h+1}$ is added to the mutually insignificant subintervals $I_g, I_{g+1}, I_{g+2}, \ldots, I_{g+h}$, then $I_{g+h+1}$ is added to the subset $I_{x1}, I_{x2}, I_{x3}, \ldots, I_{xl}$ if none of these $I_{x1}, I_{x2}, I_{x3}, \ldots, I_{xl}$ is left dominant to $I_{g+h+1}$. If $I_{g+h+1}$ added to the subset $I_{x1}, I_{x2}, I_{x3}, \ldots, I_{xl}$, then all those subintervals which are already part of it and left dominated by $I_{g+h+1}$ are removed from this subset. The subintervals $I_{x1}, I_{x2}, I_{x3}, \ldots, I_{xl}$ satisfy that none of these are left dominant over other. To ensure $I_{g+h+1}$ is left side insignificant with each of $I_g, I_{g+1}, I_{g+2}, \ldots, I_{g+h}$, it is enough to check whether $I_{g+h+1}$ is left side insignificant with each of $I_{t1}, I_{t2}, I_{t3}, \ldots, I_{tk}$.

DETAILED IMPLEMENTATION

The purpose of the invention is to build a computing system for automatic discretization of continuous attributes in large quantities of classified data which minimizes information loss and optimizes the performance of machine learning algorithms which require only discrete attributes. FIG. 1 shows how the computing system processes the inventive algorithm. The user of the computing system using a client computer 100 connects to a database 104 and/or file system 108 to input data set to run the inventive algorithm 112. The algorithm running on a processor 112 sends the results to a data repository 116 and to the client computer 120. The computing system uses multiple CPU processors with each having its own set of memory set and data storage. The invention is in the reduction of number of significance tests to be performed to merge adjacent subintervals of a continuous attribute and later to put all merged subintervals which are mutually insignificant with respect to class distribution into a single bucket group. The invention discretizes all continuous attributes in parallel in a distributed computing system with a single scan of data irrespective of its size. The system guarantees that almost all the subintervals put in to a bucket will be mutually insignificant with respect to class distribution.

The invention reduces considerably the number of statistical significance tests if not to almost linear.

The invention discretizes all continuous variables in parallel with a single scan of the dataset in a distributed computing system. By using Rules 1, 2a, 2b, 3, 4a, and 4b, the inventive method optimizes the number of statistical significance tests to merge sequential subintervals which form a partition of a continuous attribute.

The system generates sequential subintervals with varying optimum length which forms a partition for each continuous attribute so that each subinterval defines a record set with minimum predefined cardinality and predefined minimum number of success and failure records. From now onwards, these sequentially generated subintervals are called partition elements. A set of sequential partition elements which are mutually insignificant is called a bucket. Initially the system creates an empty bucket. Once a new partition element is created, the system checks whether the new partition element is mutually insignificant with each of the partition elements present in the bucket. If yes, the new partition element is added to the present bucket. If not, the system writes the present bucket to a file and creates a new bucket and adds the present partition element to it.

For each bucket created, the system creates and updates two subsets of partition elements, called left dominant and right dominant partition element sets, one for each left side and right side significance tests. By performing significance tests with each partition elements present in these subsets for left side and right side significance tests, the system ensures that the present element is mutually insignificant with each of the partition element present in the bucket. Whenever a new partition element is added to the bucket, the system applies rules 1, 2a, 2b, 3, 4a and 4b to check whether the new partition element is to be added to these subsets, if yes, the system adds it to one of the subsets or for both according to its relevance to be added in those subsets. if it is added to these subsets, the system remove irrelevant partition elements in those subsets by using same rules 1, 2a, 2b, 3, 4a and 4b.

To check whether the present partition element is mutually insignificant with each of the partition element in the present bucket, the system first checks whether it is mutually left side insignificant with each element of the left dominant partition element set and then checks whether it is mutually right side insignificant with each element of the left dominant partition element set of the present bucket.

After completion of creating buckets, the system reads all the buckets and sorts them according to high success ratio and groups sequential buckets in to a bucket group of insignificant buckets if they are mutually insignificant.

A computing node is a computer processing unit (CPU). Any computing infrastructure which has a computing processing unit and dedicated memory can be the computing node provided it meets the minimum processing and memory capabilities. This invention uses multiple computing nodes to process various embodiments of the invention. Each computing node receives a set of data and computes the intended output and shares it with other computing nodes.

The computing system contains multiple such computing nodes with one of them being set as a centralized node or master computing node. The compute node can be set up on a given IT infrastructure using available cluster management tools. The master compute node assigns the computing tasks and resources to different computing nodes and coordinates and organizes the resources available with the computing nodes appropriately.

Figure 2:
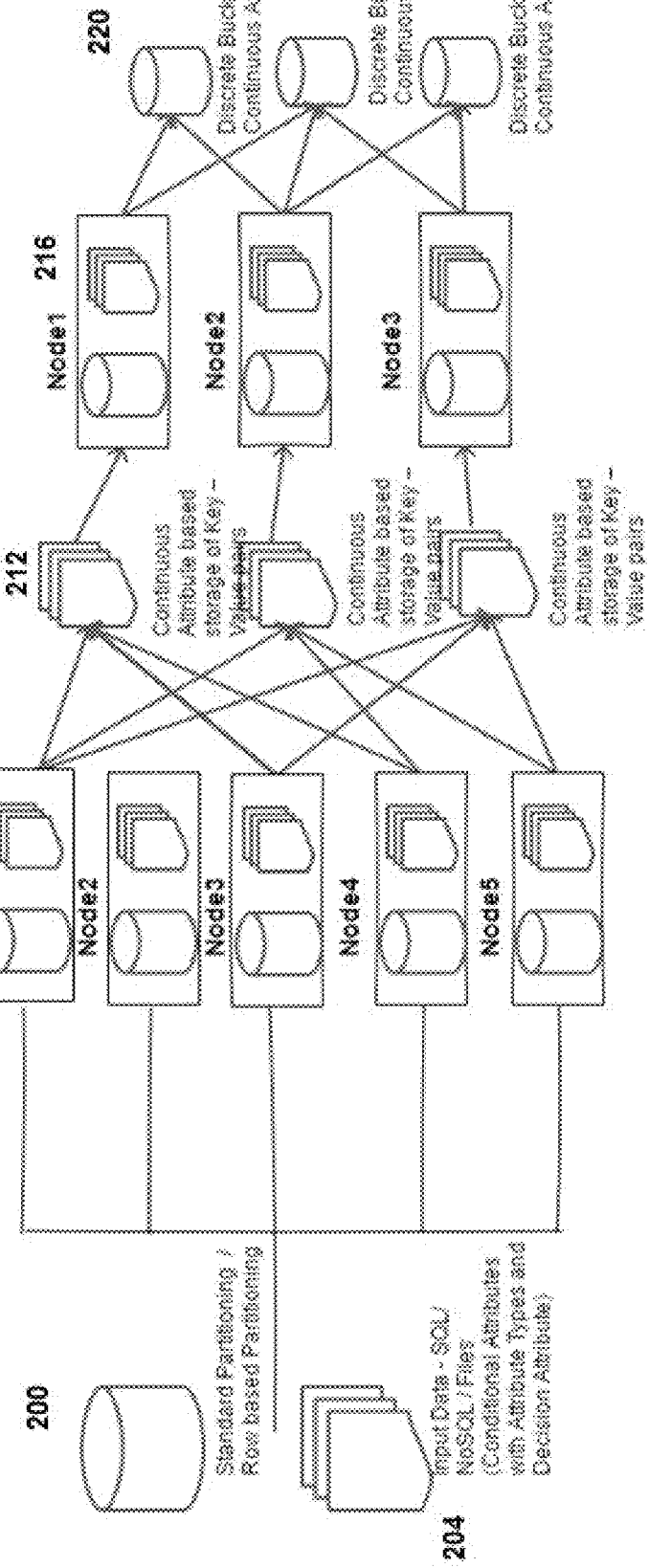
FIG. 2 shows the overall process for computing discrete buckets for continuous attributes for a data set.
Figure 3:
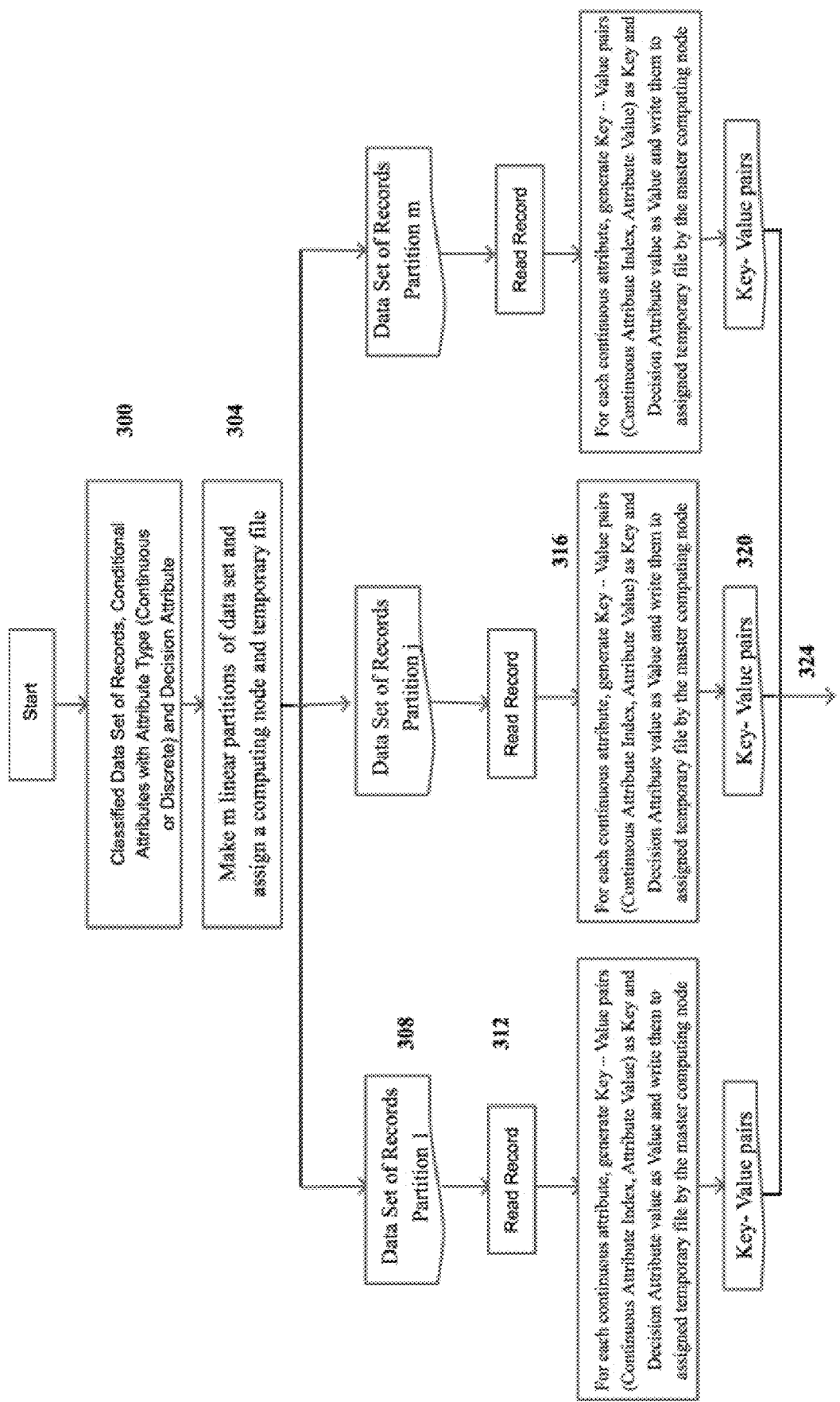
FIG. 3 shows the flow chart for the work flow to compute the discrete buckets.

FIG. 2 shows the computing process for the discrete buckets for continuous attributes of a dataset. FIG. 3 shows the flow chart for generating attribute-value pairs to be used to create bucket groups. Initially, the system will be provided the dataset in which each record is having all the conditional attribute values in specified order and at the end having the decision attribute value 300. In other words, the dataset will be in the form of a table where each column represents an Attribute Value of each record and each row represents a record (observed instance). The system also be provided the index of each attribute in the record, the type of attribute in the form of a Boolean value true for continuous and false for non-continuous, the list of success values in decision attribute, minimum frequency, minimum number of successes and minimum number of failures for each bucket.

If there are k available computing nodes, the system makes k row based partitions of the input dataset 200, 204, and at block 304 and assign a partition of dataset to each computing node 208. Each value of a decision attribute represents a unique class in the dataset. The computing node reads records sequentially from the assigned row based partition dataset 308, 312 and forms a key (Continuous Attribute Index, Attribute Value) 212, and at block 316 and value (decision attribute value) pairs for each continuous attribute 212, sort them on Attribute Index followed by Attribute Value, group them based on attribute Index and send each group in sorted Attribute Index and Attribute Value pairs 320 sequentially to a computing node for further processing.

The system uses the following data structure PE to represent a partition element (PE).

| Data Structure Partition Element |
| --- |
| Partition_Element_ID |
| lower_limit |
| upper_limit |
| Hashtable<String, Integer> label_distbn |
| Integer frequency |
| success_probability |
| standard_error |
| RCV_lower_limit |
| RCV_upper_limit |
| LCV_lower_limit |
| LCV_upper_limit |

Partition_Element_ID is used to assign a unique id for each partition element. It consists Attribute Index and sequential number of partition element in the partition of the Attribute.
  lower_limit is used to store lowest value of the partition element.
  upper_limit is used to store upper limit (not included) of the partition element.
Frequency is used to store the number of records having the value belongs to the partition element.
  label_distbn is used to represent class distribution of the partition element.
  success_probability is used to store the probability of records having one of the specified success classes in the record set of the partition element.
  standard_error is used to store the square of the standard error of the success records in the record set of the partition element.
  RCV_lower_limit is used store right critical value (RCV) lower limit of the success probability.
  RCV_upper_limit is used store right critical value (RCV) upper limit of the success probability.
  LCV_lower_limit is used store left critical value (LCV) lower limit of the success probability.
  LCV_upper_limit is used store left critical value (LCV) upper limit of the success probability.

The system use the following data structure Bucket to represent a bucket.

| Bucket |
| --- |
| Bucket_ID |
| ArrayList<PartitionElement> |
| Dominant_Partition_Element_Set_For_RCI |
| ArrayList<PartitionElement> |
| Dominant_Partition_Element_Set_For_LCI |
| Integer frequency |
| Hashtable<String, Integer> label_distbn |
| Double lower_limit |
| Double upper_limit |
| Double success_probability |

Bucket_ID is used to assign a unique id for each Bucket. It consists Attribute Index and sequential number of Bucket of the Attribute.
  Dominant_Partition_Element_Set_For_RCI is used to store all the right dominant partition elements of the bucket.
  Dominant_Partition_Element_Set_For_LCI is used to store all the left dominant partition elements of the bucket.
  frequency is used to store the number of records having the value belongs to one of the partition elements in this bucket label_distbn is used to represent class distribution of the records in this bucket.

lower_limit is used to store lowest value of the bucket.

upper_limit is used to store upper limit (not included) of the bucket.

success_probability is used to store the probability of records having one of the specified success classes in the record set of the bucket.

Figure 4:
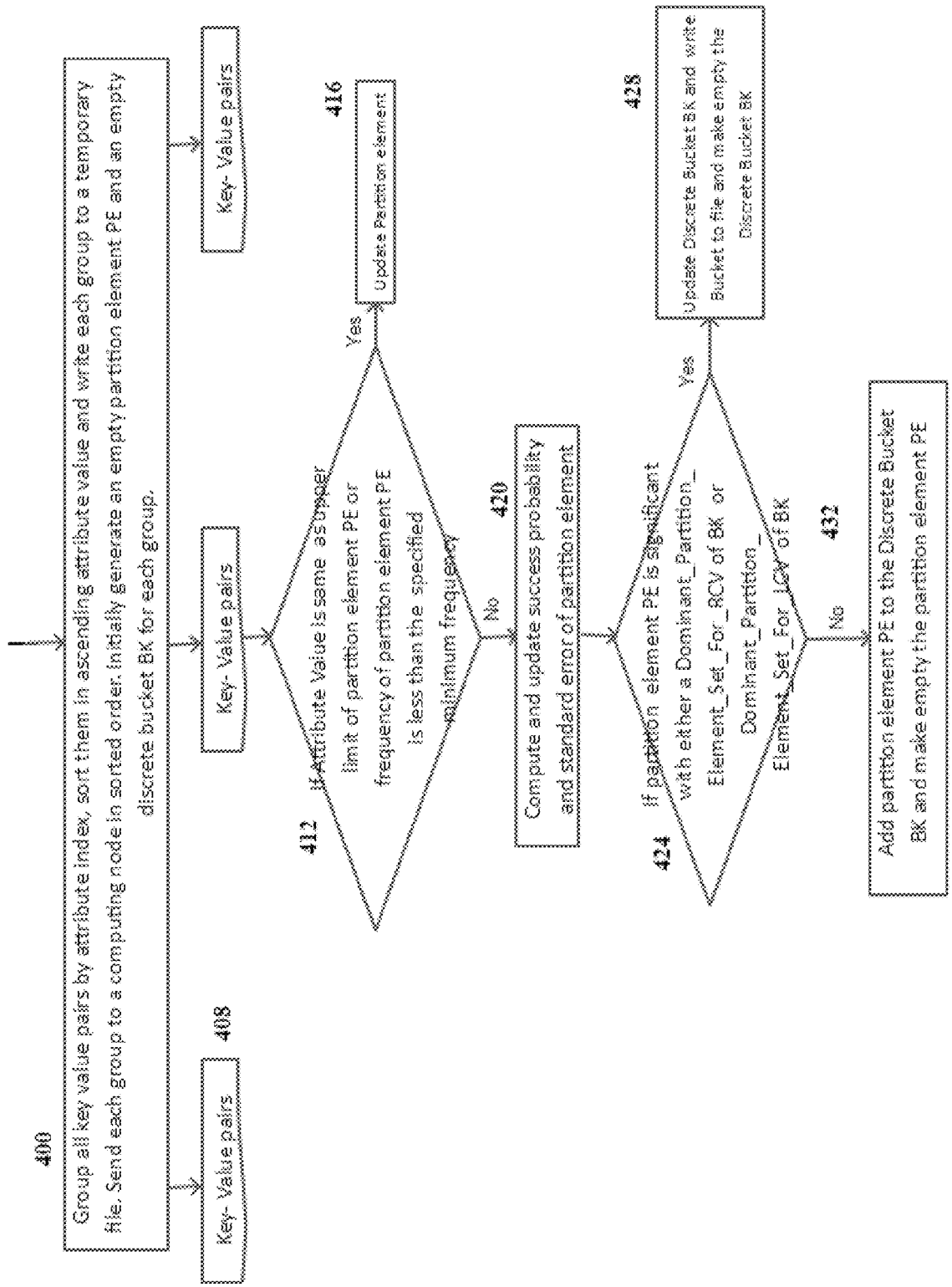
FIG. 4 shows the second portion of the flow chart for the work flow to compute the discrete buckets.

FIG. 4 shows the flow chart for the work flow in determining discrete bucket. The computing node which receives sequentially sorted Attribute Index and Attribute Value pairs based on Attribute values initially create a partition element with the following default values.

---
Partition_Element_ID=(Attribute Index,1)
lower_limit=negative infinity;
upper_limit= negative infinity;
label_distbn=empty hashtable;
frequency=0;
success_probability=0.0;
standard_error =0.0;
RCV_lower_limit=negative infinity;
RCV_upper_limit= negative infinity;
LCV_lower_limit= positive infinity;
LCV_upper_limit= positive infinity;

---

The computing node which receives sequentially sorted Attribute Index and Attribute Value pairs based on Attribute values initially create a bucket with the following values 400.

---
Bucket_ID=(Attribute Index,1)
Dominant_Partition_Element_Set_For_RCV = empty set of PE
Dominant_Partition_Element_Set_For_LCV =empty set of PE.
Integer frequency=0.
label_distbn=empty hash table.
lower_limit=Negative Infinity.
upper_limit=Positive Infinity.
success_probability=0.0;

---

After receiving each (Attribute Index, Attribute Value), and Decision Attribute Value pair, the computing node 216, and at block 408 updates the partition element as follows.

If the newly received Attribute value is same as the upper limit of the partition element 412, then the system updates partition elements frequency and label_distribution 416. If partition element has minimum frequency, minimum successes and failures and the newly received Attribute value is not same as the upper limit of the partition element 412, then the system computes success_probability, standard_error, RCV_lower_limit, RCV_upper_limit, LCV_lower_limit, LCV_upper_limit of the present partition element and updates the values respectively. Then the system checks if (1) the present partition element is mutually right insignificant with each of partition elements in Dominant_Partition_Element_Set_For_RCI of the present bucket 424, (2) the present partition element is mutually left insignificant with each of partition elements in Dominant_Partition_Element_Set_For_LCI of the present bucket 424. If yes for both, the system updates the present bucket upper_value to (bucket upper_value+partition element lower_value)/2 428 and writes the bucket to a file. Then the system creates a new bucket 428 and adds the present partition element to it and updates bucket values. If not for any case, then the system updates the present bucket by updating lower_limit and upper_limit if they are greater and smaller than the present partition element 432. Then the system checks if there is any dominant right partition element in Dominant_Partition_Element_Set_For_RCV of the present bucket. If yes, the system adds the present partition element to Dominant_Partition_Element_Set_For_RCV. Then the system checks the added partition element right dominates any of the existing partition elements in the Dominant_Partition_Element_Set_For_RCV and if yes, the system removes all those partition elements from Dominant_Partition_Element_Set_For_RCV. In similar way, the system checks if there is any dominant left partition element in Dominant_Partition_Element_Set_For_LCV of the present bucket. If not, the system adds the present partition element to Dominant_Partition_Element_Set_For_LCV. Then the system checks the added partition element left dominates any of the existing partition elements in the Dominant_Partition_Element_Set_For_RCV and if yes, the system removes all those partition elements from Dominant_Partition_Element_Set_For_RCV.

If partition element is not having minimum frequency and minimum successes and failures, then the system updates the upper_value of the present partition element with received value, frequency to frequency +1 and label distribution with the present record's decision attribute value 416.

Figure 5:
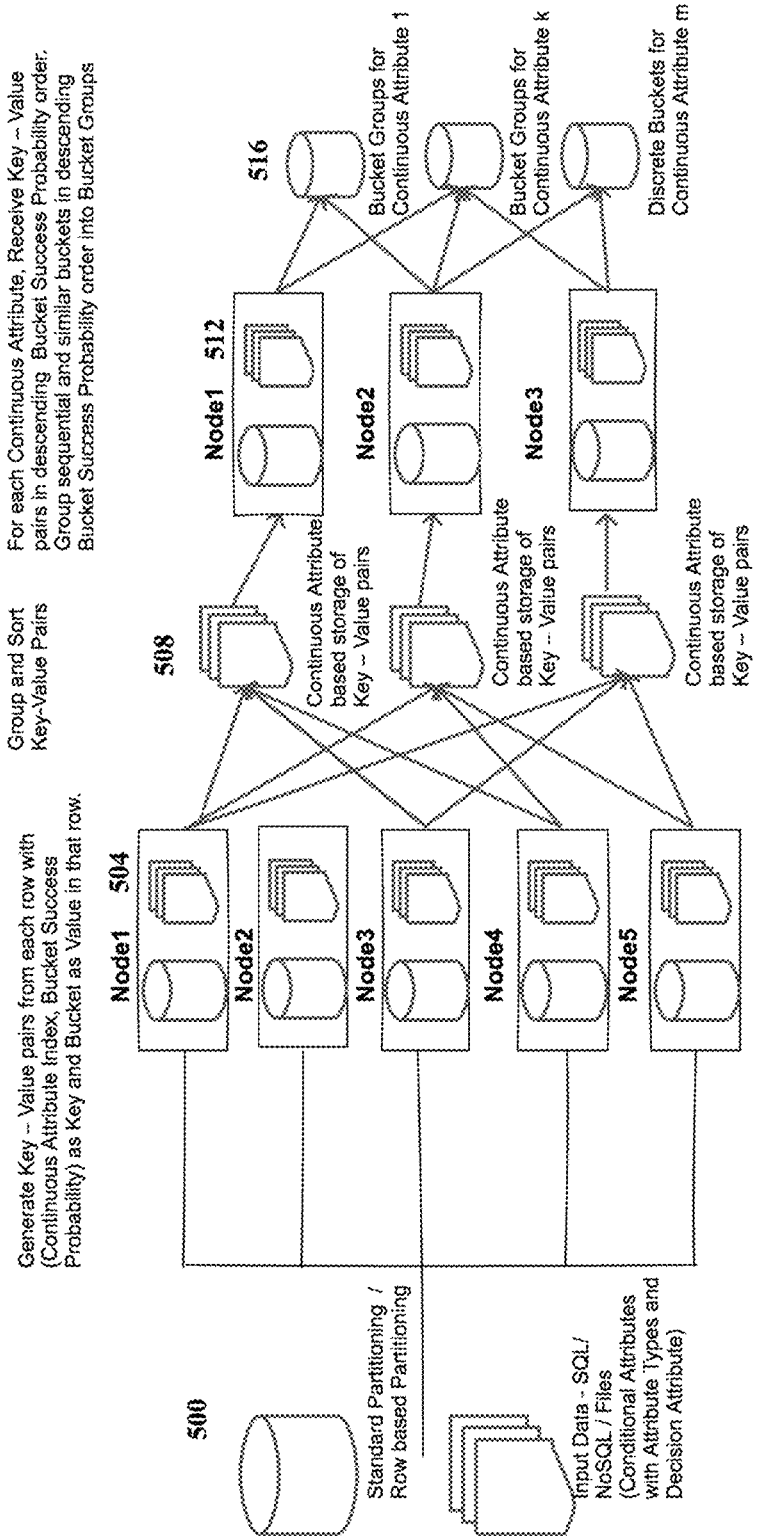
FIG. 5 shows the overall process for grouping similar bucket groups.
Figure 6:
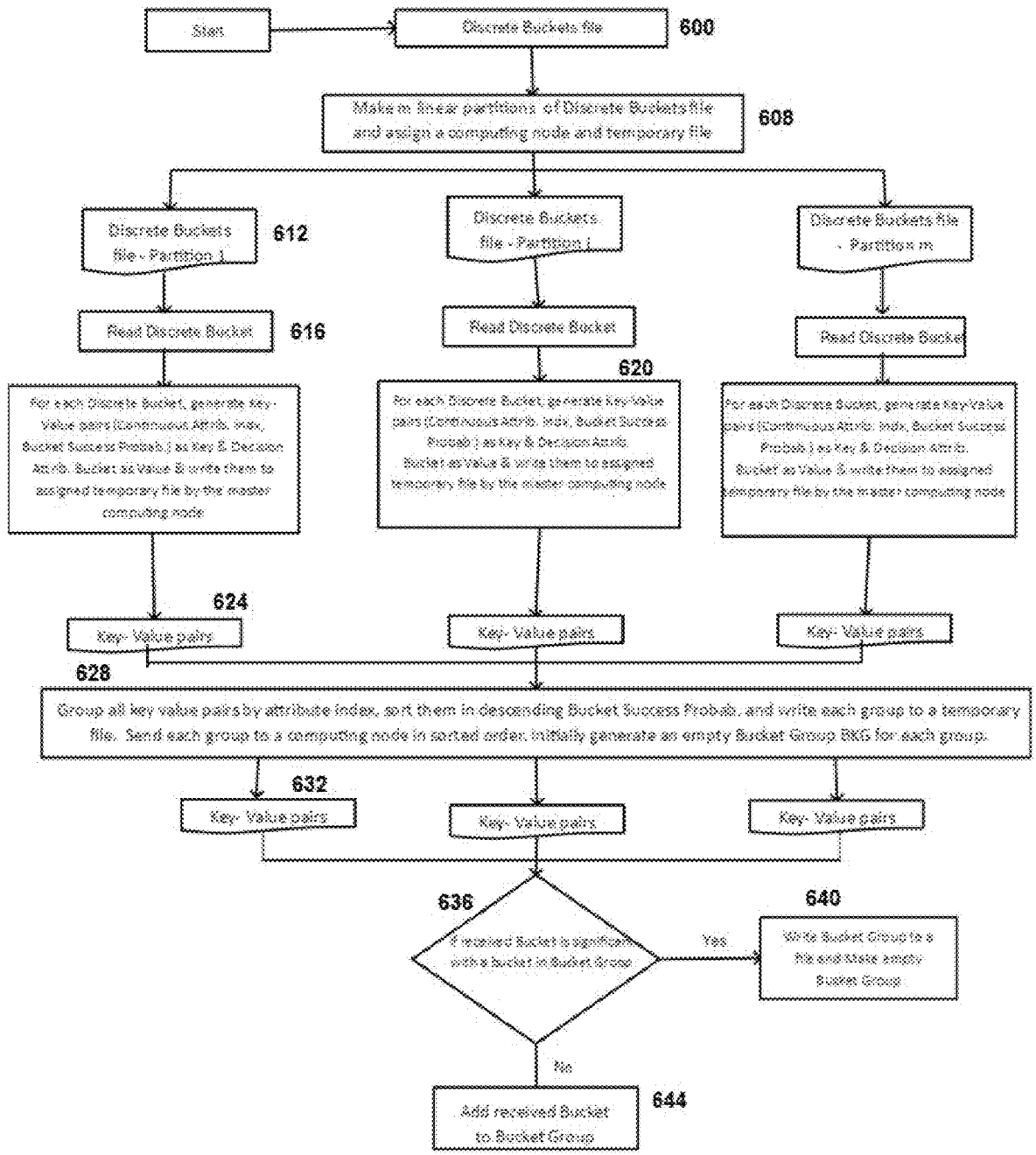
FIG. 6 shows the flow chart for grouping bucket groups.

FIG. 5 shows high level process of group bucket groups. FIG. 6 shows the flow chart for grouping bucket groups. After completion of creating buckets, the system reads all the buckets 500, 600 along with key which is Attribute Index and sort them by Attribute Index and followed by success probability and group sequential buckets of a continuous attribute in to a bucket group so that all the buckets in this group are mutually insignificant 220.

If there are k available computing nodes, the system makes k row based partitions of bucket set 608 and assigns a partition to each computing node 504, and at block 612. The computing node reads Attribute Index as key and Bucket as Value 616 sequentially from the assigned row based partition of Bucket set and forms a key (Continuous Attribute Index, Success probability) and value (Bucket) pairs 508, and at block 620, 624 sorts them on Attribute Index followed by Success Probability, groups them based on attribute Index and send each group in sorted success probability sequentially to a computing node for further processing.

The system use the following data structure BucketGroup to represent a bucket group.

| BucketGroup |
|---|
| ArrayList<Bucket> Bucket Set<br>Group ID |

ArrayList<Bucket> Bucket Set is used to store all mutually insignificant buckets.

Group ID is used to assign a Group ID for each Bucket Group.

The computing node which receives sequentially sorted Buckets on success probability of a continuous attribute initially creates a bucket group with the following values 628.

Bucket Set=Empty Array List

Group ID=1

If newly received Bucket is insignificant with all the buckets present in the bucket group 512, 636, the computing node add it to the Bucket Group 516, 644. Otherwise, the computing node writes the bucket group to the file and creates a new Bucket Group 640 with incremented Index and add the newly received bucket to it. Once it completes receiving Buckets a continuous Attribute, finally it writes the last Bucket Group to the file.

Process at Master Computing Node

Below is the pseudo-code for processing at the master computing node. The input for this pseudo-code is: Dataset, Continuous Attribute Indices, an output file, minimum frequency of a bucket, minimum successes and failures, significance level and list of success labels.

1) Create a list of keys to hold all keys along with a pointer to a temporary file for each key in which all values of that key are to be stored.
2) Make row based m partitions of the dataset of records
3) Assign each partition and a new temporary file to a computing node to process to generate key, value pairs.
4) Initiate computing nodes to generate key, value pairs (xxx)
5) For each temporary file written by computing nodes
   a) Read key value pair
      i) If the key is already added to the list of keys. Write the value in the temporary file pointed by the key.
   b) Else
      i) Create a temporary file and add the key to the list of keys and point the key to the created temporary file
      ii) Write the value in the temporary file for which the key points to.
6) If computing nodes (assigned to generate key value pairs from records) exhaust generating key value pairs.
   a) Sort all the keys in ascending Attribute Index [column number] followed by ascending Attribute Value.
   b) Group all keys with same Attribute Index.
   c) For each group of keys having same Attribute Index
      i) Assign the temporary files in sorted key order pointed by the key to an available computing node to compute buckets.
   d) Initiate computing nodes to compute [buckets].

Process at Computing Node, Which Generate Key Value Pairs (Actual Processing by the Compute Node):

1) For each record in the assigned partitioned dataset
   a) Read record
   b) Extract Decision Attribute Value
   c) For each Continuous Attribute in the data set
      i) Extract Continuous Attribute Value
      ii) Write Continuous Attribute Index and Continuous Attribute Value pair as key and Decision Attribute Value as value to the temporary file, which is assigned by the master computing node.

Process at Computing Node, Which Computes Buckets (Note: Each computing node receives a set of sorted key value pairs grouped by the Attribute Index value so that key, value pairs having same Attribute Index will be sent to the same computing node. Key is an (Attribute Index and the Attribute value) pair and value is the Decision Attribute value).

1) Create an empty Partition Element PE with default values
2) Create an empty Bucket BK with default values
3) Receive the grouped key, value pairs having same Attribute Index from master computing node in sorted key order
4) If key has Attribute Value same as upper limit of PE
   i) If hash table label_distbn of PE contains key Decision Attribute Value then increase the corresponding value (frequency) by one.
   ii) Else insert the key, value pair (Decision Attribute Value, 1) in to the label_distbn of PE.
   iii) Increase the frequency of PE by one.
5) Else if PE is not having minimum frequency or PE is not having minimum number of successes or PE is not having minimum number of failures
   i) Assign Attribute Value to upper_limit of PE
   ii) If hash table label_distbn of PE contains key Decision Attribute Value then increase the corresponding value by one.
   iii) Else insert the key, value pair (Decision Attribute Value, 1) in to the label_distbn of PE.
   iv) Increase the frequency of PE by one.
6) Else compute and update success_probability and standard_error of PE
   i) For each PartitionElement PE1 in Dominant_Partition_Element_Set_For_RCV of BK
   If PE1 is significant with PE
      a) Compute and update success_probability of BK
      b) Update upper_limit of BK by (higher_limit of BK+lower_limit of PE)/2
      c) Write ((Attribute_index, success_ratio of BK), BK) to file.
      d) Create a new Bucket BK with default values and update Bucket_ID's Attribute Index and Bucket Sequence number as one more than the sequence number of the previous bucket.
      e) Add PE to BK (Adding a Partition Element to a Bucket is described later)
      f) Create a new Partition Element PE with default Values and update Partition_Element_ID's Attribute Index and Partition Element Sequence number as one more than the sequence number of the previous Partition Element.
      g) Insert the key, value pair (Decision Attribute Value, 1) in to the label_distbn of PE.
      h) Increase the frequency of PE by one
   If PE is not significant with any PartitionElement PE1 in Dominant_Partition_Element_Set_For_RCV of BK
   For each PartitionElement PE1 in Dominant_Partition_Element_Set_For_LCV of BK
   If PE1 is significant with PE
      a) Compute and update success_probability of BK
      b) Update upper_limit of BK by (higher_limit of BK+lower_limit of PE)/2
      c) Write ((Attribute_index, success_ratio of BK), BK) to file.
      d) Create a new Bucket BK with default values and update Bucket_ID's Attribute Index and Bucket Sequence number as one more than the sequence number of the previous bucket.
      e) Add PE to BK (Adding a Partition Element to a Bucket is described later)
      f) Create a new Partition Element PE with default Values and update Partition_Element_ID's Attribute Index and Partition Element Sequence number as one more than the sequence number of the previous Partition Element.
      g) Insert the key, value pair (Decision Attribute Value, 1) in to the label_distbn of PE.
      h) Increase the frequency of PE by one
   If PE is not significant with any PartitionElement PE1 in Dominant_Partition_Element_Set_For_RCV of BK
      a) Add PE to BK
      b) Create a new Partition Element PE with default Values and update Partition_Element_ID's Attribute Index and Partition Element Sequence number as one more than the sequence number of the previous Partition Element.

c) Insert the key, value pair (Decision Attribute Value, 1) in to the label_distbn of PE.
d) Increase the frequency of PE by one
7) Compute and update success_probability of BK
8) Write ((Attribute_index, success_ratio of BK), BK) to file.

Pseudo Code to Add a Partition Element (PE) to a Bucket (BK)

Note: To add partition element (PE) to bucket (BK), upper_limit of BK should be same as lower_limit of PE. PE shouldn't be significant of any Partition Element either in Dominant_Partition_Element_Set_For_RCV or in Dominant_Partition_Element_Set_For_LCV.

1) Assign upper_limit of PE to upper_limit of BK.
2) Update frequency of BK by (frequency of BK+frequency of PE).
3) For each key in label_distbn of PE If key is in label_distbn of BK
  Update value for key in label_distbn of BK by (value for key in label_distbn of BK+value for key in label_distbn of PE)
Else
  Insert (key, value for key in label_distbn of PE) in to label_distbn of BK
4) For each PartitionElement PE1 in Dominant_Partition_Element_Set_For_RCV of BK
  If PE1 is right dominant over PE Break;
  Else PE is right dominant over PE1 Remove PE1 from Dominant_Partition_Element_Set_For_RCV of BK.

If none of PartitionElements in Dominant_Partition_Element_Set_For_RCV of BK is not dominant over PE Add PE to Dominant_Partition_Element_Set_For_RCV of BK.
5) For each PartitionElement PE1 in Dominant_Partition_Element_Set_For_LCV of BK
  If PE1 is left dominant over PE Break;
  Else PE is left dominant over PE1 Remove PE1 from Dominant_Partition_Element_Set_For_LCV of BK.

If none of PartitionElements in Dominant_Partition_Element_Set_For_LCV of BK is not dominant over PE Add PE to Dominant_Partition_Element_Set_For_LCV of BK.

Pseudo Code to Determine RCI_upper_limit, RCI_lower_limit, RCI_upper_limit, and LCI_lower_limit Partition Element PE

---

Input: Partition Element PE, Significance $\alpha$, and minimum frequency n.

RCI_lower_limit of PE = success ratio of PE +

$$Z_{(1-\frac{\alpha}{2})}\sqrt{(\text{standard Error of PE})^2}$$

LCI_upper_limit of PE = success ratio of PE −

$$Z_{(1-\frac{\alpha}{2})}\sqrt{(\text{standard Error of PE})^2}$$

If success ratio of PE >= 0.5
  RCI_upper_limit of PE = success ratio of $$PE + Z_{(1-\frac{\alpha}{2})}\sqrt{(\text{standard Error of PE})^2 + \frac{\text{success ratio of PE} * (1 - \text{success ratio of PE})}{n}}$$

LCI_lower_limit of PE = success ratio of PE −

$$Z_{(1-\frac{\alpha}{2})}\sqrt{(\text{standard Error of PE})^2 + \frac{1}{4*n}}$$

Else
  RCI_upper_limit of PE = success ratio of PE +

$$Z_{(1-\frac{\alpha}{2})}\sqrt{(\text{standard Error of PE})^2 + \frac{1}{4*n}}$$

LCI_lower_limit of PE = success ratio of PE −

$$\sqrt{(\text{standard Error of PE})^2 + \frac{\text{success ratio of PE} * (1 - \text{success ratio of PE})}{n}}$$

---

Pseudo Code to Determine Whether a Partition Element PE is Right Dominant Over Another Partition Element PE1
  If success ratio of PE<=success ratio of PE1 and standard error of PE<=standard error of PE1
  Return true
  Else If RCI_upper_limit of PE<=RCI_lower_limit of PE1
  Return True Pseudo Code to Determine Whether a Partition Element PE is Left Dominant Over Another Partition Element PE1
  If success ratio of PE>=success ratio of PE1 and standard error of PE<=standard error of PE1

Return true
Else If LCI_lower_limit of PE<=RCI_upper_limit of PE1
  Return True

Pseudo Code to Determine Whether a Partition Element PE Success Ratio is Right Significant Over Success Ratio of Another Partition Element PE1

---

Input: Partition Elements PE, PE1, Significance α, and minimum frequency n.
If success ratio of PE >= success ratio of PE1 +

$$Z_{(1-\frac{\alpha}{2})}\sqrt{(\text{Standard error of PE1})^2 + (\text{Standard error of PE})^2}$$

Return True
Else
  Return False

---

Pseudo Code to Determine Whether a Partition Element PE Success Ratio is Left Significant Over Success Ratio of Another Partition Element PE1

---

Input: Partition Elements PE, PE1, Significance α, and minimum frequency n.
If success ratio of PE <= success ratio of PE1 −

$$Z_{(1-\frac{\alpha}{2})}\sqrt{(\text{Standard error of PE1})^2 + (\text{Standard error of PE})^2}$$

Return True
Else
  Return False

---

Pseudo Code to Determine Whether a Partition Element PE Success Ratio is Significant Over Success Ratio of Another Partition Element PE1

---

Input: Partition Elements PE, PE1, Significance α, and minimum frequency n.
If success ratio of PE >= success ratio of PE1 +

$$Z_{(1-\frac{\alpha}{2})}\sqrt{(\text{Standard error of PE1})^2 + (\text{Standard error of PE})^2} \text{ or success}$$

ratio of PE <= success ratio of PE1 −

$$Z_{(1-\frac{\alpha}{2})}\sqrt{(\text{Standard error of PE1})^2 + (\text{Standard error of PE})^2}$$

Return True
Else
  Return False

---

Pseudo-Code For Grouping Buckets at the Master Computing Node

The input to the pseudo-code: Bucket Set File, output file, significance level.

1) Create a list of keys to hold all keys along with a pointer to a temporary file for each key in which all values of that key are to be stored
2) Make row based m partitions of the bucket set file
3) Assign each partition and a new temporary file to a computing node to process to generate key, value pairs
4) Initiate computing nodes to generate key, value pairs
5) For each temporary file written by computing nodes
   a) Read key value pair
      i) If the key is already added to the list of keys Write the value in the temporary file pointed by the key.
   b) Else
      i) Create a temporary file and add the key to the list of keys and point the key to the created temporary file
      ii) Write the value in the temporary file for which the key points to
6) If computing nodes (assigned to generate key value pairs from records) exhaust generating key value pairs
   a) Sort all the keys ascending Attribute Index followed by success ratio.
   b) Group all keys with same Attribute Index.
   c) For each group of keys having same Attribute Index
      i) Assign the temporary files in sorted key order pointed by the key to an available computing node to compute buckets
   d) Initiate computing nodes to compute node.

Pseudo-Code For Processing at a Computing Node, Which Generates Key Value Pairs:

1) For each record in the assigned partitioned bucket set
   a) Read key (Attribute Index, Success ratio) and value bucket.
   b) For each Continuous Attribute
      i) Write Continuous Attribute Index and Success ratio pair as key and Bucket as value to the temporary file, which is assigned by the master computing node.

Pseudo-Code to Process at a Computing Node, Which Groups Buckets (Note: Each computing node receives a set of sorted key value pairs grouped by the Attribute index value so that key, value pairs having same Attribute Index will be sent to the same computing node. Key will be an Attribute Index and the success probability pair and value will be the Bucket).

1) Create an empty Bucket Group BKG with values
   Bucket Set=Empty Array List
   Group ID=1
2) Receive the grouped key, value pairs having same Attribute Index from master computing node in sorted success probability order
3) For each bucket BK in Bucket group BKG
   i) If BK is insignificant with newly received bucket BK1
      a) For each Partition Element PE in BK
      For each Partition Element PE1 in BK1
        If PE is significant with PE1
        Write Bucket Group BKG to the file.
        Create a new Bucket Group BKG with values
        Bucket Set=Empty Array List
        Group ID=Group ID of BKG+1.
      If BK1 is insignificant with all elements in BKG Add BK to BKG.
4) Write Bucket Group BKG to the file.

Below is an example Partition Elements table for Age Distribution in Adult Data Set. Only a partial the age distribution dataset is shown.

Input: minimum frequency=10, Significance=0.01 and success class is GT50k.

| Lower Limit | Higher Limit | Label Distribution | Freq. | Success ratio | Std. Error | RCV Lower Limit | RCV upper Limit | LCV Lower Limit | LCV upper Limit |
|---|---|---|---|---|---|---|---|---|---|
| 0 | 17.5 | {LTE50K = 395} | 395 | 0.0000 | 0 | 0.0000 | 0.4092 | 0.0000 | 0.0000 |
| 17.5 | 18.5 | {LTE50K = 550} | 550 | 0.0000 | 0 | 0.0000 | 0.4087 | 0.0000 | 0.0000 |
| 18.5 | 19.5 | {LTE50K = 710, GT 50K = 2} | 712 | 0.0028 | 0 | 0.0079 | 0.4112 | −0.0407 | −0.0023 |
| 19.5 | 20.5 | {LTE50K = 753} | 753 | 0.0000 | 0 | 0.0000 | 0.4083 | 0.0000 | 0.0000 |
| 20.5 | 21.5 | {LTE50K = 717, GT 50K = 3} | 720 | 0.0042 | 0.00001 | 0.0104 | 0.4126 | −0.0488 | −0.0020 |
| 21.5 | 22.5 | {LTE50K = 752, GT 50K = 13} | 765 | 0.0170 | 0.00002 | 0.0291 | 0.4255 | −0.0892 | 0.0049 |
| 22.5 | 23.5 | {LTE50K = 865, GT 50K = 12} | 877 | 0.0137 | 0.00002 | 0.0238 | 0.4220 | −0.0817 | 0.0036 |
| 23.5 | 24.5 | {LTE50K = 767, GT 50K = 31} | 798 | 0.0388 | 0.00005 | 0.0565 | 0.4475 | −0.1199 | 0.0212 |
| 24.5 | 25.5 | {LTE50K = 788, GT 50K = 53} | 841 | 0.0630 | 0.00007 | 0.0847 | 0.4718 | −0.1365 | 0.0414 |
| 25.5 | 26.5 | {LTE50K = 722, GT 50K = 63} | 785 | 0.0803 | 0.00009 | 0.1053 | 0.4893 | −0.1430 | 0.0552 |
| 26.5 | 27.5 | {LTE50K = 754, GT 50K = 81} | 835 | 0.0970 | 0.0001 | 0.1235 | 0.5061 | −0.1461 | 0.0706 |
| 27.5 | 28.5 | {LTE50K = 748, GT 50K = 119} | 867 | 0.1373 | 0.00014 | 0.1674 | 0.5465 | −0.1453 | 0.1071 |
| 28.5 | 29.5 | {LTE50K = 679, GT 50K = 134} | 813 | 0.1648 | 0.00017 | 0.1984 | 0.5744 | −0.1400 | 0.1312 |
| 29.5 | 30.5 | {LTE50K = 690, GT 50K = 171} | 861 | 0.1986 | 0.00018 | 0.2337 | 0.6083 | −0.1290 | 0.1635 |
| 30.5 | 31.5 | {LTE50K = 705, GT 50K = 183} | 888 | 0.2061 | 0.00018 | 0.2411 | 0.6157 | −0.1260 | 0.1710 |
| 31.5 | 32.5 | {LTE50K = 639, GT 50K = 189} | 828 | 0.2283 | 0.00021 | 0.2659 | 0.6382 | −0.1165 | 0.1906 |
| 32.5 | 33.5 | {LTE50K = 684, GT 50K = 191} | 875 | 0.2183 | 0.0002 | 0.2543 | 0.6280 | −0.1208 | 0.1822 |
| 33.5 | 34.5 | {LTE50K = 643, GT 50K = 243} | 886 | 0.2743 | 0.00022 | 0.3130 | 0.6842 | −0.0920 | 0.2356 |
| 34.5 | 35.5 | {LTE50K = 659, GT 50K = 217} | 876 | 0.2477 | 0.00021 | 0.2854 | 0.6576 | −0.1067 | 0.2101 |
| 35.5 | 36.5 | {LTE50K = 635, GT 50K = 263} | 898 | 0.2929 | 0.00023 | 0.3321 | 0.7029 | −0.0807 | 0.2537 |
| 36.5 | 37.5 | {LTE50K = 566, GT 50K = 292} | 858 | 0.3403 | 0.00026 | 0.3821 | 0.7506 | −0.0487 | 0.2986 |
| 37.5 | 38.5 | {LTE50K = 545, GT 50K = 282} | 827 | 0.3410 | 0.00027 | 0.3836 | 0.7514 | −0.0484 | 0.2984 |
| 38.5 | 39.5 | {LTE50K = 538, GT 50K = 278} | 816 | 0.3407 | 0.00028 | 0.3835 | 0.7512 | −0.0486 | 0.2979 |
| 39.5 | 40.5 | {LTE50K = 526, GT 50K = 268} | 794 | 0.3375 | 0.00028 | 0.3809 | 0.7481 | −0.0510 | 0.2942 |
| 40.5 | 41.5 | {LTE50K = 529, GT 50K = 279} | 808 | 0.3453 | 0.00028 | 0.3885 | 0.7558 | −0.0453 | 0.3021 |
| 41.5 | 42.5 | {LTE50K = 510, GT 50K = 270} | 780 | 0.3462 | 0.00029 | 0.3901 | 0.7568 | −0.0448 | 0.3022 |
| 42.5 | 43.5 | {LTE50K = 497, GT 50K = 273} | 770 | 0.3545 | 0.0003 | 0.3991 | 0.7652 | −0.0386 | 0.3100 |
| 43.5 | 44.5 | {LTE50K = 443, GT 50K = 281} | 724 | 0.3881 | 0.00033 | 0.4349 | 0.7991 | −0.0126 | 0.3414 |
| 44.5 | 45.5 | {LTE50K = 446, GT 50K = 288} | 734 | 0.3924 | 0.00032 | 0.4389 | 0.8033 | −0.0091 | 0.3458 |
| 45.5 | 46.5 | {LTE50K = 445, GT 50K = 292} | 737 | 0.3962 | 0.00032 | 0.4427 | 0.8072 | −0.0059 | 0.3497 |
| 46.5 | 47.5 | {LTE50K = 420, GT 50K = 288} | 708 | 0.4068 | 0.00034 | 0.4545 | 0.8179 | −0.0028 | 0.3591 |
| 47.5 | 48.5 | {LTE50K = 326, GT 50K = 217} | 543 | 0.3996 | 0.00044 | 0.4540 | 0.8119 | −0.0044 | 0.3453 |
| 48.5 | 49.5 | {LTE50K = 371, GT 50K = 206} | 577 | 0.3570 | 0.0004 | 0.4086 | 0.7689 | −0.0379 | 0.3055 |
| 49.5 | 50.5 | {LTE50K = 341, GT 50K = 261} | 602 | 0.4336 | 0.00041 | 0.4857 | 0.8454 | 0.0253 | 0.3814 |

Discrete Bucket Set calculation for Attribute Age in Adult Data Set.

Input: minimum frequency=10, Significance=0.01 and success class is GT50k.

Note that age range of 36.5 to 46.5 has 6 left dominant partition elements and the age range 61.5 to 75.5 has 7 right dominant partition elements.

| Lower Limit | Higher Limit | Label Distribution | Freq. | Left Dominant PEs (#) | Right Dominant PEs (#) | Success ratio |
|---|---|---|---|---|---|---|
| 0 | 21.5 | {LTE50K = 3125; GT50K = 5;} | 3130 | 1 | 1 | 0.001597444 |
| 21.5 | 23.5 | {LTE50K = 1617; GT50K = 25;} | 1642 | 2 | 1 | 0.015225335 |
| 23.5 | 25.5 | {LTE50K = 1555; GT50K = 84;} | 1639 | 2 | 1 | 0.0512508 |
| 25.5 | 27.5 | {LTE50K = 1476; GT50K = 144;} | 1620 | 2 | 1 | 0.0888889 |
| 27.5 | 29.5 | {LTE50K = 1427; GT50K = 253;} | 1680 | 2 | 1 | 0.1505952 |
| 29.5 | 33.5 | {LTE50K = 2718; GT50K = 734;} | 3452 | 3 | 2 | 0.2126304 |
| 33.5 | 36.5 | {LTE50K = 1937; GT50K = 723;} | 2660 | 3 | 1 | 0.2718045 |
| 36.5 | 46.5 | {LTE50K = 5045; GT50K = 2803;} | 7848 | 6 | 2 | 0.3571611 |
| 46.5 | 49.5 | {LTE50K = 1117; GT50K = 711;} | 1828 | 1 | 2 | 0.3889497 |
| 49.5 | 54.5 | {LTE50K = 1497; GT50K = 1057;} | 2554 | 2 | 2 | 0.4138606 |
| 54.5 | 61.5 | {LTE50K = 1629; GT50K = 847;} | 2476 | 3 | 3 | 0.3420840 |
| 61.5 | 75.5 | {LTE50K = 1376; GT50K = 415;} | 1791 | 1 | 7 | 0.2317141 |
| 75.5 | 81.5 | {LTE50K = 133; GT50K = 29;} | 162 | 4 | 2 | 0.1790123 |
| 84.5 | ∞ | {LTE50K = 43; GT50K = 8;} | 51 | 1 | 1 | 0.1568627 |

Bucket Groups calculation for Attribute Age in Adult Data Set. Note that Bucket Group #5 contains three buckets as part of the bucket group. Bucket group #4, #6, #8, #9 each contain two buckets each.

Input: minimum frequency=10, Significance=0.01 and success class is GT50k.

| Bckt Grp ID | Lower Limit | Higher Limit | Label Distribution | Freq. | Left Dominant PEs (#) | Right Dominant PEs (#) | Success ratio |
|---|---|---|---|---|---|---|---|
| 0 | 0 | 21.5 | {LTE50K = 3125; GT50K = 5;} | 3130 | 1 | 1 | 0.001597444 |
| 1 | 21.5 | 23.5 | {LTE50K = 1617; GT50K = 25;} | 1642 | 2 | 1 | 0.015225335 |
| 2 | 23.5 | 25.5 | {LTE50K = 1555; GT50K = 84;} | 1639 | 2 | 1 | 0.051250763 |
| 3 | 25.5 | 27.5 | {LTE50K = 1476; GT50K = 144;} | 1620 | 2 | 1 | 0.088888889 |
| 5 | 27.5 | 29.5 | {LTE50K = 1427; GT50K = 253;} | 1680 | 2 | 1 | 0.150595238 |
| 6 | 29.5 | 33.5 | {LTE50K = 2718; GT50K = 734;} | 3452 | 3 | 2 | 0.212630359 |
| 7 | 33.5 | 36.5 | {LTE50K = 1937; GT50K = 723;} | 2660 | 3 | 1 | 0.271804511 |
| 8 | 36.5 | 46.5 | {LTE50K = 5045; GT50K = 2803} | 7848 | 6 | 2 | 0.357161060 |
| 9 | 46.5 | 49.5 | {LTE50K = 1117; GT50K = 711;} | 1828 | 1 | 2 | 0.388949672 |
| 9 | 49.5 | 54.5 | {LTE50K = 1497; GT50K = 1057} | 2554 | 2 | 2 | 0.413860611 |
| 8 | 54.5 | 61.5 | {LTE50K = 1629; GT50K = 847;} | 2476 | 3 | 3 | 0.342084006 |
| 6 | 61.5 | 75.5 | {LTE50K = 1376; GT50K = 415;} | 1791 | 1 | 7 | 0.231714126 |
| 5 | 75.5 | 81.5 | {LTE50K = 133; GT50K = 29;} | 162 | 4 | 2 | 0.179012346 |
| 4 | 81.5 | 84.5 | {LTE50K = 25; GT50K = 3;} | 28 | 1 | 1 | 0.107142857 |
| 5 | 84.5 | ∞ | {LTE50K = 43; GT50K = 8;} | 51 | 1 | 1 | 0.156862745 |

All examples and conditional language recited herein are intended for educational purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents hereof. Additionally, it is intended that such equivalents include both currently known equivalents as well as equivalents developed in the future, i.e., any elements developed that perform the same function, regardless of structure.

The invention claimed is:

1. A computer implemented method to obtain discrete partitions from classified data set with one or more continuous attributes and a decision attribute using multiple processors, comprising:

reading data set records in parallel from the assigned row based partitions to a processor;

forming a key value pair where a key of the key value pair is based on a continuous attribute index and attribute value and a value of the key value pair is based on decision attribute value;

sorting said attribute value in ascending order on attribute index followed by attribute value;

creating partitions based on unique attribute index;

adding record sequentially to a partition until attribute value of record is same as upper limit of a partition element or until minimum frequency has been reached for the partition element;

adding the partition element to a bucket until it is mutually insignificant with all partition elements in the bucket;

adding a partition element into a bucket until attribute value of record is same as upper limit of said partition element or until minimum frequency has been reached for said partition element;

calculating said partition element via computing node is mutually right insignificant compared with right dominant partition elements in a bucket;

calculating said partition element via a computing node is mutually left insignificant by comparing with left dominant partition elements in a bucket;

adding said mutually right insignificant and mutually left insignificant partition element into said bucket;

adding said partition element to right dominant partition elements of a bucket if none of the existing partition elements are right dominant over said partition element;

removing right dominant partition elements in that said bucket if said partition element is right dominant over them;

adding said partition element to left dominant partition elements of said bucket if none of the existing partition elements are left dominant over said partition element;

removing left dominant partition elements in said bucket if said partition element is left dominant over them;

closing said bucket and writing to a file if said partition element is mutually right significant or mutually left significant; and adding said mutually right significant or said mutually left significant partition element to a new bucket.

2. The computer implemented method of claim 1 wherein a partition element is right dominant to another partition element if right critical value upper limit of said partition element is smaller than the right critical lower value limit of other partition element in said bucket wherein a right critical value lower limit of a partition element is when another partition element having success probability less than said right critical value lower limit is not statistically significant higher value than success probability of said partition element;

wherein a right critical value upper limit of a partition element is when another partition element having success probability that is more than said right critical value upper limit will be statistically significant higher value than success probability of said partition element;

wherein said right critical value lower limit for a partition element with success probability less than 0.5 and standard error is the sum of the product of the standard score for cumulative probability with standard error for any given significance level;

wherein right critical value upper limit for a partition element with success probability p not more than 0.5 and standard error s is the sum of p and the product of the standard score for cumulative probability with the square root of the sum of the square of standard error and 1/4n for any given significance level; and wherein right critical value upper limit for a partition element with success probability more than 0.5 and standard error is the sum of the product of the standard score for cumulative probability for any given significance level with the square root of the sum of the square of standard error and standard error for minimum frequency of each partition element.

3. The computer implemented method of claim 1 wherein a partition element is left dominant to another partition element if left critical value of each partition element in said bucket is mutually insignificant when compared with each partition element in second bucket wherein a left critical value upper limit of a partition element is when another partition element having success probability that is more than said left critical value upper limit will be statistically not significant lower value than success probability of said partition element;

wherein a left critical value lower limit of a partition element is when another partition element having success probability that is less than said left critical value lower limit will be statistically significant lower value than success probability of said partition element;

wherein Left critical value lower limit for a partition element with success probability is less than 0.5 and standard error is the resulting value after the subtraction of the product of the standard score for cumulative probability for any given significance level with standard error from probability;

wherein left critical value lower limit for a partition element with success probability p not less than 0.5 and standard error s is the resulting value after the subtraction of the product of the standard score for cumulative probability for any given significance level with the square root of the sum of the square of standard error and maximum possible standard error from probability; and wherein left critical value lower limit for a partition element with success probability p less than 0.5 and standard error s is the resulting value after the subtraction of the product of the standard score for cumulative probability for any given significance level with the square root of the sum of the square of standard error and standard error for a minimum frequency of each partition element from probability.

4. The computer implemented method of claim 1 further comprising:

reading all buckets along with each key based on attribute index;

sorting said buckets by attribute index and followed by success probability;

grouping buckets of continuous attributes into a bucket group so that the buckets in a group are mutually insignificant; and creating a new bucket group; and adding newly received mutually significant bucket to said bucket group.

5. The computer implemented method of claim 2 wherein a bucket is insignificant to second bucket if each partition element in said bucket is mutually insignificant when compared with each partition element in second bucket.

6. A computer implemented method to obtain discrete partitions of continuous attributes in large quantities of classified data set with one or more continuous attributes and a decision attribute using multiple processors comprising:

generating ordered partition elements with optimum length for all continuous attributes in parallel in a distributed computing system with a single scan of data for each partition element defining a record set with minimum predefined cardinality and predefined minimum number of success and failure records;

merging adjacent partition elements of a continuous attribute;

generating mutually significant buckets of partition elements;

putting mutually insignificant partition elements of an attribute with respect to class distribution into same bucket computing and updating left dominant and right dominant partition element set for each bucket, one for each left-side and right-side significance test;

sorting said buckets according to high success ratio;

grouping sequential buckets into a bucket group of insignificant buckets if they are mutually insignificant;

reading data set records in parallel from the assigned row-based partitions of that data set into a processor;

forming a key value pair where a key of the key value pair is based on a continuous attribute index and attribute value and a value of the key value pair is based on decision attribute value;

sorting keys in ascending order on attribute index followed by attribute value;

sending sorted keys having same attribute index into same processor to create a partition set of that attribute;

creating partition elements based on unique attribute index further comprising steps of:

creating first partition element with negative infinity as lower bound and the attribute value of the first received record as upper bound;

adding record sequentially to a partition element until attribute value of record is same as upper limit of that partition element or until minimum frequency has been reached for that partition element; and creating an empty bucket and calculating via a computing node and adding the newly created partition element to the bucket if it is mutually insignificant compared with each of the partition elements present in the bucket;

adding each ordered partition element to the bucket until it is mutually insignificant with all partition elements exist in said bucket;

closing the bucket when newly created partition element is mutually significant and storing it in memory and creating a new bucket; and adding the newly created partition element to the said new bucket.

7. The computer implemented method of claim 6 further comprising:

processing all partition elements formed at a computing node;

calculating said partition element via said computing node is mutually right insignificant compared with right dominant partition elements in a bucket;

calculating said partition element via said computing node is mutually left insignificant by comparing with left dominant partition elements in said bucket;

adding said mutually right insignificant and mutually left insignificant
partition element into said bucket;

adding said partition element to right dominant partition elements of said bucket if none of the existing partition elements are right dominant over said partition element; removing right dominant partition elements in said bucket if said partition element is right dominant over them;

adding said partition element to left dominant partition elements of said bucket if none of the existing partition elements are left dominant over said partition element;

removing left dominant partition elements in said bucket if said partition element is left dominant over them;

closing said bucket and writing to a file if said partition element is mutually right significant or mutually left significant; and adding said mutually right significant or said mutually left significant partition element to a new bucket.

8. The computer implemented method of claim 7 wherein a partition element is mutually insignificant to each of partition elements in a bucket if partition element is mutually right insignificant when compared to right dominant partition elements in said bucket and partition element is mutually left insignificant to the left dominant partition elements in said bucket.

9. The computer implemented method of claim 7 wherein said bucket is insignificant to second bucket if each partition element in said bucket is mutually insignificant when compared to each partition element in second bucket.

\* \* \* \* \*